(12) United States Patent
Li et al.

(10) Patent No.: US 10,798,082 B2
(45) Date of Patent: Oct. 6, 2020

(54) NETWORK AUTHENTICATION TRIGGERING METHOD AND RELATED DEVICE

(71) Applicant: Huawei Technologies Co., Ltd., Shenzhen (CN)

(72) Inventors: He Li, Shanghai (CN); Jing Chen, Shanghai (CN); Huan Li, Shanghai (CN); Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/388,326

(22) Filed: Apr. 18, 2019

(65) Prior Publication Data
US 2019/0253403 A1 Aug. 15, 2019

Related U.S. Application Data

(63) Continuation of application No. PCT/CN2018/099197, filed on Aug. 7, 2018.

(30) Foreign Application Priority Data

Aug. 7, 2017 (CN) .......................... 2017 1 0667037

(51) Int. Cl.
*H04L 29/06* (2006.01)
*H04L 9/30* (2006.01)
(Continued)

(52) U.S. Cl.
CPC ................ *H04L 63/08* (2013.01); *H04L 9/30* (2013.01); *H04L 9/32* (2013.01); *H04W 12/02* (2013.01); *H04W 12/06* (2013.01)

(58) Field of Classification Search
None
See application file for complete search history.

(56) References Cited

U.S. PATENT DOCUMENTS

2010/0313024 A1* 12/2010 Weniger .............. H04L 63/0823
713/170
2012/0263298 A1 10/2012 Suh et al.
(Continued)

FOREIGN PATENT DOCUMENTS

CN 1790984 A 6/2006
CN 102026178 A 4/2011
(Continued)

OTHER PUBLICATIONS

"3rd Generation Partnership Project; Technical Specification Group Core Network and Terminals; Numbering, addressing and identification (Release 15);" 3GPP TS 23.003, V15.0.0, Jun. 2017, 108 pages.
(Continued)

*Primary Examiner* — Jeffery L Williams
(74) *Attorney, Agent, or Firm* — Conley Rose, P.C.

(57) ABSTRACT

This application relates to the field of communications technologies, and discloses a network authentication triggering system, method and a related device. The method includes: receiving a first message from a terminal, where the first message carries first identity information and identifier information, the first identity information is encrypted identity information, and the identifier information is used to identify an encryption manner of the first identity information; and sending a second message to a first security function entity, where the second message is used to trigger authentication for the terminal, and the second message carries the identifier information. This application provides a solution of triggering an authentication process when identity information is encrypted.

14 Claims, 13 Drawing Sheets

(51) Int. Cl.
*H04W 12/02* (2009.01)
*H04W 12/06* (2009.01)
*H04L 9/32* (2006.01)

(56) References Cited

U.S. PATENT DOCUMENTS

| | | | |
|---|---|---|---|
| 2013/0170643 | A1 | 7/2013 | Xiao et al. |
| 2018/0317086 | A1* | 11/2018 | Ben Henda ............ H04L 9/0844 |
| 2018/0367998 | A1* | 12/2018 | Kunz .................... H04W 12/12 |
| 2019/0036697 | A1* | 1/2019 | Jerichow ............. H04L 63/0428 |
| 2019/0098502 | A1* | 3/2019 | Torvinen ............. H04L 63/0414 |
| 2019/0149521 | A1* | 5/2019 | Jerichow ............... H04W 12/02 |
| | | | 713/171 |
| 2019/0182718 | A1* | 6/2019 | Shan .................. H04W 36/0022 |
| 2019/0364463 | A1* | 11/2019 | Youn ................. H04W 36/0011 |

FOREIGN PATENT DOCUMENTS

| | | |
|---|---|---|
| CN | 102131188 A | 7/2011 |
| CN | 104270737 A | 1/2015 |
| CN | 104754581 A | 7/2015 |

OTHER PUBLICATIONS

"3rd Generation Partnership Project; Technical Specification Group Services and System Aspects; 3GPP System Architecture Evolution (SAE); Security architecture (Release 15)," 3GPP TS 33.401, V15.0.0, Jun. 2017, 153 pages.
"3rd Generation Partnership Project; Technical Specification Group Services and System Aspects; Security Architecture and Procedures for 5G System (Release 15)," 3GPP TS 33.501, V0.2.0, May 2017, 25 pages.
Ericsson, et al., "Skeleton proposal for privacy related sub-clauses," 3GPP TSG SA WG3 (Security) Meeting #88 S3-171777, (revision of S3-17xabc), Aug. 7-11, 2017, 4 pages.
Ericsson, et al., "Requirements related to subscription permanent identifier, and subscription concealed identifier," 3GPP TSG SA WG3 (Security) Meeting #88, S3-172116, (revision of S3-171778), Aug. 7-11, 2017, 3 pages.
Ericsson, et al., "Subscription privacy: proposed changes to authentication procedures," 3GPP TSG SA WG3 (Security) Meeting #88, S3-171781(revision of S3-17xabc), Aug. 7-11, 2017, 7 pages.
Ericsson, et al., "SUCI—format and generation," 3GPP TSG SA WG3 (Security) Meeting #88, S3-171786 (revision of S3-17xabc), Aug. 7-11, 2017, 1 page.
Ericsson, et al., "Subscription privacy: proposed changes to authentication procedures," 3GPP TSG SA WG3 (Security) Meeting #88, S3-172117 (revision of S3-171781), Aug. 7-11, 2017, 7 pages.
Ericsson, et al., "SUCI—format and generation," 3GPP TSG SA WG3 (Security) Meeting #88, S3-172143 (revision of S3-171786), Aug. 7-11, 2017, 1 page.
Nokia, "Subscriber identity privacy and its management," 3GPP TSG SA WG3 (Security) Meeting #88, S3-171953 (revision of S3-17xabc), Aug. 7-11, 2017, 4 pages.
Ericsson, "Requirements related to subscription permanent identifier, and subscription concealed identifier," 3GPP TSG SA WG3 (Security) Meeting #88, Aug. 7-11, 2017 S3-171778 (revision of S3-17xabc), Aug. 7-11, 2017, 3 pages.
Machine Translation and Abstract of Chinese Publication No. CN1790984, Jun. 21, 2006, 16 pages.
Machine Translation and Abstract of Chinese Publication No. CN102026178, Apr. 20, 2011, 8 pages.
Machine Translation and Abstract of Chinese Publication No. CN104754581, Jul. 1, 2015, 9 pages.
Foreign Communication From A Counterpart Application, PCT Application No. PCT/CN2018/099197, English Translation of International Search Report dated Oct. 8, 2018, 2 pages.
Machine Translation and Abstract of Chinese Publication No. CN104270737, Jan. 7, 2015, 14 pages.
Ericsson, "Clarification on how the authentication method, and the variant is chosen between AUSF and UDM/ARPF," 3GPP TSG SA WG3 (Security) Meeting #88, S3-171967, Aug. 7-11, 2017, Dali, China, 7 pages.
Huawei, et al., "UE sends SEAF Conceleade IMSI during Primary Authentication," 3GPP TSG SA WG3 (Security) Meeting #88, S3-171830, Aug. 7-11, 2017, Dali, China, 7 pages.

* cited by examiner

NETWORK AUTHENTICATION TRIGGERING METHOD AND RELATED DEVICE

CROSS-REFERENCE TO RELATED APPLICATIONS

This application is a continuation of International Application No. PCT/CN2018/099197, filed on Aug. 7, 2018, which claims priority to Chinese Patent Application No. 201710667037.3, filed on Aug. 7, 2017, The disclosures of the aforementioned applications are hereby incorporated by reference in their entireties.

TECHNICAL FIELD

This application relates to the field of communications technologies, and in particular, to a network authentication triggering method and a related device.

BACKGROUND

Currently, a terminal may access a network by using a 3GPP technology or by using a non-3GPP technology. When a terminal accesses a 5G network and is registered for the first time, regardless of whether the terminal accesses the 5G network by using the 3GPP technology or by using the non-3GPP technology, the terminal needs to send, to a device in a core network, an attachment message carrying permanent identity information, so that the device in the core network triggers an authentication process according to the attachment message, to perform authentication for the terminal.

In a related technology, when a terminal accesses a 5G network and performs an Initial Registration, the terminal may send permanent identity information of the terminal to an access and mobility management (AMF) entity in a core network via a next generation NodeB (gNB) or a non-3GPP interworking function (N3IWF) entity. When the AMF entity receives the permanent identity information of the terminal, the AMF entity triggers an authentication process, and then the AMF entity may select an authentication server function (AUSF) entity based on the permanent identity information of the terminal, to initiate authentication and verification of the terminal.

In the foregoing related technology, when the terminal sends the permanent identity information to the AMF entity via the gNB or the N3IWF, to trigger the authentication process, no encryption processing is performed on the permanent identity information. In this case, the permanent identity information is easily intercepted or tampered with in a transmission process, and security of the terminal is under threat.

SUMMARY

Embodiments of this application provide a network authentication triggering method and a related device, to resolve a problem in the related technology that security of a terminal is under threat because a permanent identity provided by the terminal for an AMF entity is unencrypted when an authentication process is triggered. The technical solutions are as follows:

According to a first aspect, a network authentication triggering method is provided. The method includes: receiving, by a first network device, a first message from a terminal, where the first message carries first identity information and identifier information, the first identity information is obtained by the terminal by encrypting identity information in a permanent identity of the terminal based on a public key, and the identifier information is used to identify whether the first identity information is encrypted identity information and/or identify an encryption manner of the first identity information; and sending, by the first network device, a second message to a first security function entity according to the first identity information, where the second message is used to trigger authentication for the terminal.

In the solution of this embodiment of this application, the first network device may send the second message to the first security function entity according to the first identity information, to trigger authentication for the terminal. It can be learned that this embodiment of this application provides a solution of triggering an authentication process when identity information is encrypted. Because identity information sent by the terminal to the first network device is encrypted, the identity information is prevented from being intercepted or tampered with in a transmission process, and security of the terminal is ensured.

Further, during implementation of this application, the first message carries the identifier information, to identify whether the first identity information is encrypted information and/or identify the encryption manner of the first identity information, so that a function entity used to decrypt the first identity information can decrypt the first identity information faster and more conveniently.

In a possible design, the public key is stored in the terminal, or is stored in a card that is in the terminal and that is used to store a long-term key.

In a possible design, the identifier information is a first identifier, and the first identifier is used to identify whether the first identity information is encrypted identity information; or the identifier information is a second identifier, and the second identifier is used to identify the encryption manner of the first identity information; or the identifier information is a third identifier, and the third identifier is used to identify whether the first identity information is encrypted identity information and identify the encryption manner of the first identity information; or the identifier information includes a first identifier and a second identifier, the first identifier is used to identify whether the first identity information is encrypted identity information, and the second identifier is used to identify the encryption manner of the first identity information.

In a possible design, the first network device sends a permanent identity request message to the first security function entity, where the permanent identity request message carries the first identity information; the first network device receives a permanent identity reply message from the first security function entity, where the permanent identity reply message carries second identity information, and the second identity information is obtained by decrypting the first identity information; and the first network device sends the second message to the first security function entity, where the second message carries the second identity information.

In a possible design, the first network device may alternatively send a permanent identity request message to a second network device, where the permanent identity request message carries the first identity information; the first network device receives a permanent identity reply message from the second network device, where the permanent identity reply message carries second identity information, and the second identity information is obtained by decrypting the first identity information; and the first network device sends the second message to the first security function entity, where the second message carries the second identity information.

In a possible design, the second identity information is obtained by the second network device by decrypting the first identity information by using a stored private key; or the second identity information is obtained after the second network device forwards the first identity information to a third network device and the third network device decrypts the first identity information.

In a possible design, the first network device sends the second message to the first security function entity, where the second message carries the first identity information; then the first network device receives second identity information from the first security function entity, where the second identity information is obtained by decrypting the first identity information, where the receiving, by the first network device, second identity information from the first security function entity includes one of the following cases: receiving, by the first network device, a third message from the first security function entity, where the third message carries an authentication response message, the authentication response message carries the second identity information and an authentication vector, and the authentication vector is used to perform authentication for the terminal; or the third message carries the second identity information and an authentication response message, the authentication response message carries an authentication vector, and the authentication vector is used to perform authentication for the terminal; or the third message carries an authentication success message, and the authentication success message carries the second identity information; or the third message carries the second identity information and an authentication success message; or receiving, by the first network device, a fourth message sent by the first security function entity, where the fourth message carries an authentication vector and the second identity information, and the authentication vector is used to perform authentication for the terminal.

In a possible design, before receiving the second identity information from the first security function entity, the first network device receives an authentication vector sent by the first security function entity, performs authentication for the terminal by using the authentication vector, and sends an authentication acknowledgement message to the first security function entity after the authentication for the terminal succeeds.

In a possible design, after receiving the second identity information from the first security function entity, the first network device may store the second identity information.

In a possible design, the second network device is any one of an authentication credential repository and processing function entity, a unified data management entity, a key management server, or a verification center.

According to a second aspect, a network authentication triggering method is provided. The method includes: receiving, by a first security function entity, a second message from a first network device, where the second message is sent by the first network device based on first identity information carried in a first message of a terminal, the second message is used to trigger an authentication process for the terminal, the first identity information is obtained by the terminal by encrypting identity information in a permanent identity of the terminal based on a public key, the second message carries identifier information, and the identifier information is used to identify whether the first identity information is encrypted identity information and/or identify an encryption manner of the first identity information. In the solution of this embodiment of this application, after receiving the second message, the first security function entity may trigger authentication for the terminal. In addition, because the second message carries the identifier information, the first security function entity may determine, based on the identifier information, whether the second message carries encrypted identity information, to determine whether to perform decryption.

In a possible design, the public key is stored in the terminal, or is stored in a card that is in the terminal and that is used to store a long-term key.

In a possible design, the identifier information is a first identifier, and the first identifier is used to identify whether the first identity information is encrypted identity information; or the identifier information is a second identifier, and the second identifier is used to identify the encryption manner of the first identity information; or the identifier information is a third identifier, and the third identifier is used to identify whether the first identity information is encrypted identity information and identify the encryption manner of the first identity information; or the identifier information includes a first identifier and a second identifier, the first identifier is used to identify whether the first identity information is encrypted identity information, and the second identifier is used to identify the encryption manner of the first identity information.

In a possible design, the second message carries second identity information, and the second identity information is obtained by decrypting the first identity information.

Correspondingly, before receiving the second message from the first network device, the first security function entity receives a permanent identity request message from the first network device, where the permanent identity request message carries the first identity information; the first security function entity obtains the second identity information based on the first identity information; and the first security function entity sends a permanent identity reply message to the first network device, where the permanent identity reply message carries the second identity information.

In a possible design, the second message carries the first identity information, and after receiving the second message from the first network device, the first security function entity sends second identity information to the first network device, where the second identity information is obtained by decrypting the first identity information, where that the first security function entity sends second identity information to the first network device includes one of the following cases: the first security function entity obtains an authentication vector based on the second identity information, where the authentication vector is used to perform authentication for the terminal; and the first security function entity sends a third message to the first network device, where the third message carries an authentication response message, and the authentication response message carries the authentication vector and the second identity information, or the third message carries an authentication response message and the second identity information, and the authentication response message carries the authentication vector; or the first security function entity obtains an authentication vector based on the second identity information, where the authentication vector is used to perform authentication for the terminal; and the first security function entity performs authentication for the terminal based on the authentication vector, and sends a third message to the first network device after authentication for the terminal succeeds, where the third message carries an authentication success message, and the authentication success message carries the second identity information, or the third message carries an authentication success message and the second identity information; or the first security function entity obtains an authentication vector based on the second identity information, where the authentication vector is used to perform authentication for the terminal; and the first security function entity sends a fourth message to the first network device, where the fourth message carries the authentication vector and the second identity information; or the first security function entity obtains an authentication vector based on the second identity information, where the authentication vector is used to perform authentication for the terminal; the first security function entity sends the authentication vector to the first network device; and the first security function entity sends the second identity information to the first network device when receiving an authentication acknowledgement message sent by the first network device.

In a possible design, a process in which the first security function entity obtains the authentication vector based on the second identity information may include: sending, by the first security function entity, the second identity information to a second security function entity; and receiving, by the first security function entity, the authentication vector from the second security function entity.

In a possible design, before sending the second identity information to the first network device, the first security function entity may further obtain the second identity information based on the first identity information.

In a possible design, a process in which the first security function entity obtains the second identity information based on the first identity information may include: decrypting, by the first security function entity, the first identity information based on a private key, to obtain the second identity information; or sending, by the first security function entity, the first identity information to a second network device, and receiving the second identity information sent by the second network device, where the second identity information is obtained by the second network device by decrypting the first identity information based on a stored private key, or the second identity information is obtained after the second network device forwards the first identity information to a third network device and the third network device decrypts the first identity information.

In a possible design, the second network device is any one of an authentication credential repository and processing function entity, a unified data management entity, a key management server, or a verification center.

According to a third aspect, a network authentication triggering method is provided. The method includes: receiving, by a first security function entity, first identity information from a first network device, where the first identity information is obtained by a terminal by encrypting identity information in a permanent identity of the terminal based on a public key; sending, by the first security function entity, the first identity information to a second security function entity; and receiving, by the first security function entity, an authentication vector and second identity information from the second security function entity, and triggering an authentication process for the terminal, where the second identity information is obtained by decrypting the first identity information, and the authentication vector is obtained by the second security function entity based on the second identity information. The solution of this embodiment of this application provides a specific implementation process of triggering an authentication process when identity information is encrypted. In addition, in the solution of this embodiment of this application, the first security function entity triggers authentication for the terminal. Because an authentication process for the terminal is triggered by the first security function entity when the terminal accesses a network by using a 3GPP technology, processing for the 3GPP technology and processing for a non-3GPP technology in the authentication process for the terminal are unified according to the solution of this embodiment, thereby reducing processing complexity of a network device.

In a possible design, the second identity information is obtained by the second security function entity by decrypting the first identity information based on a stored private key; or the second identity information is obtained after the second security function entity forwards the first identity information to a second network device and the second network device decrypts the first identity information; or the second identity information is obtained after the second security function entity forwards the first identity information to a second network device, the second network device forwards the first identity information to a third network device, and the third network device decrypts the first identity information.

In a possible design, after triggering the authentication process for the terminal, the first security function entity may send an authentication vector to the first network device, receive an authentication acknowledgement message from the first network device, and send the second identity information to the first network device.

According to a fourth aspect, an embodiment of this application provides a first network device. The first network device has a function of implementing behavior of the first network device in the foregoing method design. The function may be implemented by hardware, or may be implemented by hardware executing corresponding software. The hardware or software includes one or more modules corresponding to the foregoing function.

In a possible design, the first network device includes a processor, and the processor is configured to support the first network device in performing the corresponding function in the foregoing method. Further, the first network device may further include a communications interface. The communications interface is configured to support the first network device in communicating with a first security function entity, a terminal, or another network device. Further, the first network device may further include a memory. The memory is coupled to the processor and configured to store a program instruction and data that are necessary to the first network device.

According to a fifth aspect, an embodiment of this application provides a first security function entity. The first security function entity has a function of implementing behavior of the first security function entity in the foregoing method design. The function may be implemented by hardware, or may be implemented by hardware executing corresponding software. The hardware or software includes one or more modules corresponding to the foregoing function.

In a possible design, the first security function entity includes a processor, and the processor is configured to support the first security function entity in performing the corresponding function in the foregoing method. Further, the first security function entity may further include a communications interface. The communications interface is configured to support the first security function entity in communicating with a first network device, a second security function entity, or another network device. Further, the first security function entity may further include a memory. The memory is coupled to the processor and configured to store a program instruction and data that are necessary to the first security function entity.

According to a sixth aspect, an embodiment of this application provides a second security function entity. The second security function entity has a function of implementing behavior of the second security function entity in the foregoing method design. The function may be implemented by hardware, or may be implemented by hardware executing corresponding software. The hardware or software includes one or more modules corresponding to the foregoing function.

In a possible design, the second security function entity includes a processor, and the processor is configured to support the second security function entity in performing the corresponding function in the foregoing method. Further, the second security function entity may further include a communications interface. The communications interface is configured to support the second security function entity in communicating with a first security function entity or another network device. Further, the second security function entity may further include a memory. The memory is coupled to the processor and configured to store a program instruction and data that are necessary to the second security function entity.

According to a seventh aspect, an embodiment of this application provides a terminal. The terminal has a function of implementing behavior of the terminal in the foregoing method design. The function may be implemented by hardware, or may be implemented by hardware executing corresponding software. The hardware or software includes one or more modules corresponding to the foregoing function.

In a possible design, the terminal includes a processor. The processor is configured to support the terminal in performing the corresponding function in the foregoing method. Further, the terminal may further include a communications interface. The communications interface is configured to support the terminal in communicating with a first network device or another network device. Further, the terminal may further include a memory. The memory is coupled to the processor and configured to store a program instruction and data that are necessary to the terminal.

According to an eighth aspect, an embodiment of this application provides a communications system. The system includes the terminal, the first network device, and the first security function entity in the foregoing aspects.

According to another aspect, an embodiment of this application provides a computer readable storage medium. The computer readable storage medium stores an instruction, and when the instruction runs on a computer, the computer performs the methods in the foregoing aspects.

According to another aspect, an embodiment of this application provides a computer program product including an instruction. When the instruction runs on a computer, the computer performs the methods in the foregoing aspects.

Compared with the prior art, the solutions of the embodiments of this application provide the solution of triggering an authentication process when identity information is encrypted. Because identity information sent by the terminal to the first network device is encrypted identity information, the identity information is prevented from being intercepted or tampered with in a transmission process, and security of the terminal is ensured.

DESCRIPTION OF EMBODIMENTS

The following further describes the embodiments of this application in detail with reference to the accompanying drawings.

Before the embodiments of this application are described in detail, application scenarios in the embodiments of this application are described first. Currently, a terminal may access a network by using a 3GPP technology or by using a non-3GPP technology. The 3GPP technology is an air interface technology formulated by the 3GPP standard. For example, common air interface access technologies of 3G, 4G, and 5G networks are the 3GPP technology. The non-3GPP technology is an air interface access technology formulated by a non-3GPP standard, for example, an air interface technology represented by a Wireless Fidelity access point (WiFi AP). When the terminal accesses the 5G network, regardless of whether the terminal accesses the 5G network by using the 3GPP technology or by using the non-3GPP technology, the terminal needs to send an attachment message carrying permanent identity information to a device in a core network, so that the device in the core network can trigger an authentication process, based on the attachment message and the permanent identity information, to perform authentication for the terminal. A network authentication triggering method provided in the embodiments of this application may be applied to the foregoing scenario, to trigger an authentication process for the terminal, thereby implementing authentication for the terminal.

Figure 1:
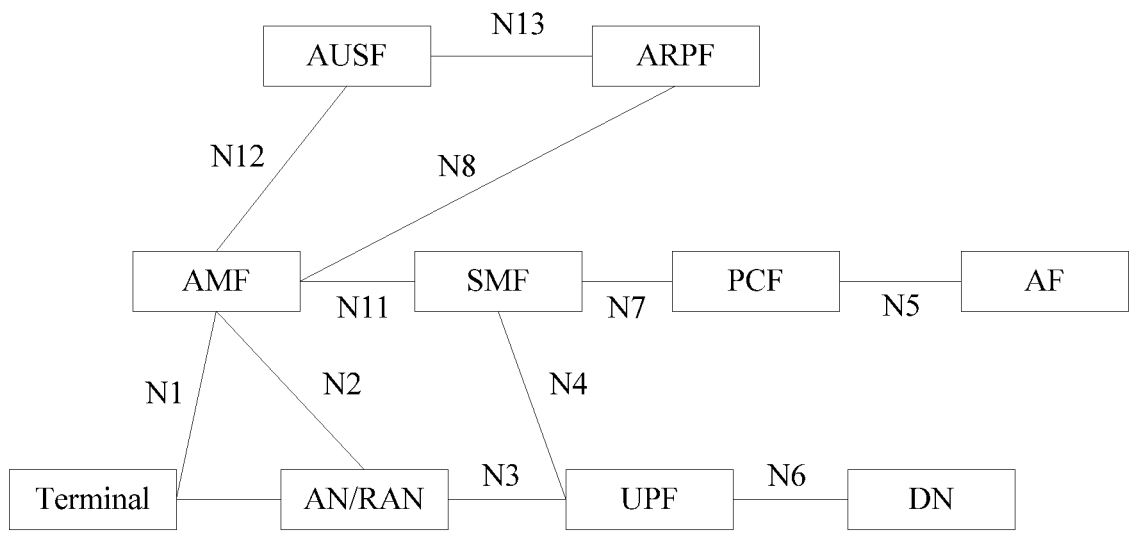
FIG. 1 is a schematic diagram of a possible network architecture according to an embodiment of this application.

A method for obtaining an identity of a terminal in the embodiments of this application may be applied to any communications system having a need of obtaining the identity of the terminal, for example, may be applied to a 5G system shown in FIG. 1.

As shown in FIG. 1, the 5G system may include a terminal, an access network (AN)/a radio access network (RAN), a data network (DN), and a plurality of network functions (NF) including an authentication server function (AUSF), an authentication credential repository and processing function (ARPF), an access and mobility management function (AMF), a session management function (SMF), a PCF, an application function (AF), and a user plane function (user plane function, UPF). It may be understood that FIG. 1 is merely an example architectural diagram. In addition to the function entities shown in FIG. 1, the 5G system may further include other function entities, and this is not limited in this embodiment of this application.

In the 5G system shown in FIG. 1, a connection may be established between function entities by using a next generation (NG) interface to implement communication. For example, the terminal may establish a control plane signaling connection to the AMF by using an N interface 1 (N1 for short). The AN/RAN may establish a user plane data connection to the UPF by using an N interface 3 (N3 for short). The AN/RAN may establish a control plane signaling connection to the AMF by using an N interface 2 (N2 for short). The UPF may establish a control plane signaling connection to the SMF by using an N interface 4 (N4 for short). The UPF may exchange user plane data with the DN by using an N interface 6 (N6 for short). The AMF may establish a control plane signaling connection to the ARPF by using an N interface 8 (N8 for short). The AMF may establish a control plane signaling connection to the AUSF by using an N interface 12 (N12 for short). The AMF may establish a control plane signaling connection to the SMF by using an N interface 11 (N11 for short). The SMF may establish a control plane signaling connection to the PCF by using an N interface 7 (N7 for short). The PCF may establish a control plane signaling connection to the AF by using an N interface 5 (N5 for short). The AUSF may establish a control plane signaling connection to the ARPF by using an N interface 13 (N13 for short).

The terminal in FIG. 1 may be UE, or may be a cellular phone, a cordless phone, a session initiation protocol (SIP) phone, a smartphone, a wireless local loop (WLL) station, a personal digital assistant (PDA), a laptop computer, a handheld communications device, a handheld computing device, a satellite radio device, a wireless modem card, and/or another device configured to perform communication in a radio system. The AN/RAN is a network including a plurality of 5G-ANs/5G-RANs, and is configured to implement a radio physical layer function, a resource scheduling and radio resource management function, a radio access control function, and a mobility management function. The 5G-AN/5G-RAN may be an access point, a next generation NodeB, an N3IWF, a transmission reception point (TRP), a transmission point (TP), or another access network device. The ARPF, AUSF, PCF, AMF, SMF, and UPF may be collectively referred to as an NF. In the NF, the AMF and the PCF may be referred to as a control plane (CP) function, and the UPF may be referred to as a user plane function (UPF). The NF, except the UPF, may work independently, or may be combined to implement a control function. For example, the combined NF may complete an access control and mobility management function such as access authentication, security encryption, and location registration of the terminal, a session management function such as setup, releasing, and changing of a user plane transmission path, and a function of analyzing some slice (slice)-related data (for example, congestion) and terminal-related data. The UPF mainly completes a function such as routing and forwarding of user plane data, for example, responsible for data packet filtering, data transmission/forwarding, rate control, charging information generation, and the like for the terminal.

Specifically, the AMF is mainly responsible for mobility management. Currently, a security anchor function (SEAF) module is further integrated into the AMF. The SEAF module is mainly responsible for initiating an authentication request to the AUSF, and completing authentication for the terminal on a network side in an authentication process of an evolved packet system. A main function of the AUSF is receiving the authentication request sent by the SEAF module, and selecting an authentication method. When an authentication method of the Extensible Authentication Protocol is used, the AUSF is mainly responsible for completing authentication for the terminal on the network device. In addition, the AUSF may request an authentication vector from the ARPF, and reply to the SEAF module with an authentication response. A main function of the ARPF is storing a long-term key, receiving an authentication vector request sent by the AUSF, calculating an authentication vector by using the stored long-term key, and sending the authentication vector to the AUSF.

After the application scenario and the system architecture in the embodiments of this application are described, the following describes in detail the solutions of the embodiments of this application.

In an existing solution, when the terminal sends the permanent identity information to the AMF via the gNB or the N3IWF, to trigger the authentication process, no encryption processing is performed on the permanent identity information. In this case, the permanent identity information is easily intercepted or tampered with in a transmission process, and security of the terminal is under threat.

Figure 2:
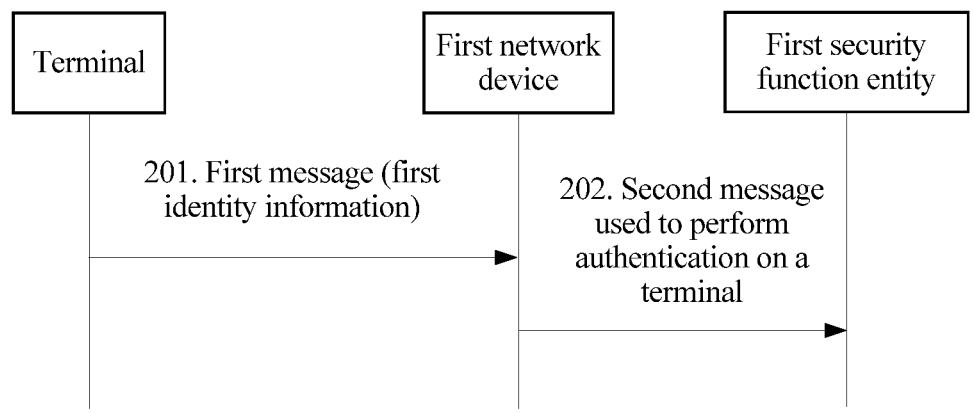
FIG. 2 is a schematic communication diagram of a network authentication triggering method according to an embodiment of this application.

In view of this, the embodiments of this application provide a network authentication triggering method, and a first network device, a first security function entity, and a system that are based on the method. The method includes: receiving, by the first network device, a first message from a terminal, where the first message carries first identity information, and the first identity information is obtained by the terminal by encrypting identity information in a permanent identity of the terminal based on a public key; sending, by the first network device, a second message to the first security function entity according to the first identity information, where the second message is used to trigger authentication for the terminal. For example, the method may be shown in FIG. 2. According to the solutions provided in the embodiments of this application, after receiving the first identity information sent by the terminal, the first network device may send the second message to the first security function entity based on the first identity information, to trigger authentication for the terminal. The first identity information is obtained by encrypting the identity information in the permanent identity. In other words, the embodiments of this application provide a solution of triggering an authentication process when identity information is encrypted. Because identity information sent by the terminal to the first network device is encrypted identity information, the identity information is prevented from being intercepted or tampered with in a transmission process, and security of the terminal is ensured.

In a possible implementation, the first message may further carry one or both of identifier information and routing information. The following describes the identifier information and the routing information.

The identifier information is used to identify whether the first identity information is encrypted identity information and/or identify an encryption manner of the first identity information. For example, the identifier information may be a first identifier, and the first identifier is used to identify whether the first identity information is encrypted identity information; or the identifier information may be a second identifier, and the second identifier is used to identify the encryption manner of the first identity information; or the identifier information is a third identifier, and the third identifier is used to identify whether the first identity information is encrypted identity information and identify the encryption manner of the first identity information; or the identifier information may include a first identifier and a second identifier, the first identifier is used to identify whether the first identity information is encrypted identity information, and the second identifier is used to identify the encryption manner of the first identity information.

The routing information may be first routing information, and the first routing information may be used by the first network device to determine a home network of the terminal, so that the first network device may select the first security function entity in the home network of the terminal. Alternatively, the routing information may be second routing information, and the second routing information is used to determine a function entity decrypting the first identity information.

In this implementation, when the first message carries the identifier information, the second message carries the identifier information.

In the embodiments of this application, the first network device may trigger an authentication process for the terminal after obtaining second identity information corresponding to the first identity information, or may obtain second identity information after triggering an authentication process. The second identity information is obtained by decrypting the first identity information. The following describes the first case with reference to FIG. 3 to FIG. 5.

Figure 3:
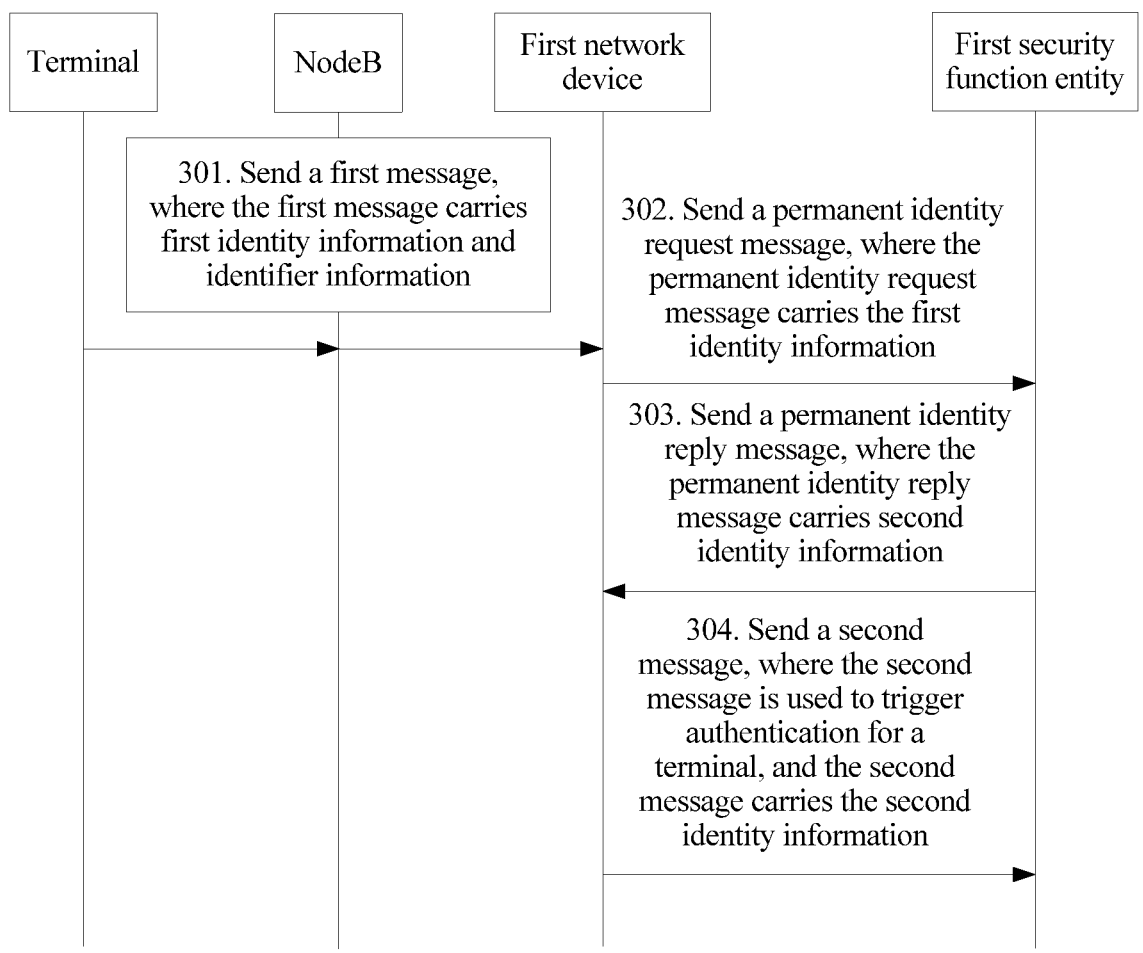
FIG. 3 is a schematic communication diagram of a network authentication triggering method according to an embodiment of this application.

FIG. 3 is a schematic communication diagram of another network authentication triggering method according to an embodiment of this application. Referring to FIG. 3, the method includes the following steps.

Step 301. A terminal sends a first message to a first network device via a base station, where the first message carries first identity information and identifier information, the first identity information is obtained by the terminal by encrypting identity information in a permanent identity of the terminal based on a public key, and the identifier information is used to identify whether the first identity information is encrypted identity information and/or identify an encryption manner of the first identity information.

The terminal may be a terminal in the 5G network architecture shown in FIG. 1, and the base station function entity may be a 3GPP base station function entity, or may be a non-3GPP base station function entity. Specifically, when the terminal accesses a 5G network by using a 3GPP technology, the base station function entity may be a gNB function entity, or an eNB function entity, or an NB function entity. When the terminal accesses a network by using a non-3GPP technology, for example, through WiFi, the base station function entity may include an N3IWF function entity. When a SEAF module is integrated into an AMF function entity, the first network device may be the AMF function entity, or may be the SEAF module in the AMF function entity. When the AMF and the SEAF are not one function entity, the first network device may be the AMF function entity, or an MME function entity, or another entity having an access and mobility management function.

When the terminal accesses a network or when authentication is performed on the terminal, the terminal may send the first message to the first network device via the base station. The first message carries the first identity information, and the first identity information is obtained by the terminal by encrypting the identity information in the permanent identity by using the public key, for example, a SUCI (subscription concealed identifier, an encrypted permanent identity). The encryption public key may be stored in the terminal, or may be stored in a card that is in the terminal and that is used to store a long-term key, for example, a subscriber identification module (SIM), a universal subscriber identity module (USIM), a universal integrated circuit card (UICC), an embedded universal integrated circuit card (eUICC), or a 5G-universal integrated circuit card (5G-UICC). The permanent identity may be an international mobile subscriber identity (IMSI), a subscription permanent identifier (subscription permanent identifier), or other identity information having a function of globally uniquely identifying the terminal. Specifically, when the permanent identity is an IMSI, the IMSI includes a mobile subscriber identification number ( ) and routing information. Therefore, the terminal may encrypt the MSIN in the IMSI by using the public key, to obtain the first identity information. When the permanent identity is not based on an IMSI structure, the first identity information may be identity information obtained by encrypting the entire permanent identity, or may be information obtained by encrypting only a part used to uniquely identify the terminal in the permanent identity.

In addition, the first message may carry first routing information, and the first routing information may be used by the first network device to determine a home network of the terminal, so that the first network device selects a first security function entity in the home network of the terminal.

Optionally, the first message may further carry second routing information, where the second routing information is used to determine a function entity decrypting the first identity information.

Optionally, the first message may carry the identifier information. Specifically, the identifier information may be a first identifier, and the first identifier is used to identify whether the first identity information carried in the first message is encrypted identity information.

In an optional implementation, when identity information carried by the terminal is not the first identity information but temporary identity information, the temporary identity information may be used as the first identifier. The temporary identity information of the terminal is delivered to the terminal by a mobility management function entity after the mobility management function entity verifies the terminal. In this way, a leakage probability of permanent identity information can be reduced, and privacy protection can be improved. The temporary identity information of the terminal may be temporary 5G identity information, or temporary LTE identity information, for example, a 5th-generation globally unique temporary identity (5G-GUTI), a globally unique temporary identity (GUTI), a System Architecture Evolution-temporary mobile subscriber identity (S-TMSI), or a temporary mobile subscriber identity (TMSI).

In another optional implementation, the first identifier may be bit information. For example, 0 represents "unencrypted", and 1 represents "encrypted".

Optionally, the identifier information carried in the first message may be a second identifier, and the second identifier is used to identify the encryption manner of the first identity information. For example, the encryption manner may be the elliptic curve cryptography. Alternatively, the encryption manner may be another predefined encryption manner on a UE side and a home network side. Optionally, a plurality of encryption manners may be configured, and each encryption manner may correspond to one second identifier. The function entity used to decrypt the first identity information may determine the encryption manner of the first identity information based on the second identifier carried in the first message, to further determine a decryption manner of the first identity information.

Optionally, the identifier information carried in the first message may be a third identifier, and the third identifier is used to identify whether the first identity information is encrypted identity information and identify the encryption manner of the first identity information. For example, the third identifier may be 8-bit information. First four bits of the information are used to identify whether the first identity information is encrypted identity information, and last four bits of the information are used to identify the encryption manner of the first identity information. When the first identity information is unencrypted identity information, all the last four bits of the information may be 0.

Optionally, the identifier information carried in the first message may include both a first identifier and a second identifier. The unified identifier indicates whether the identity information carried in the first message is encrypted identity information. In addition, when the identity information carried in the first message is encrypted identity information, the unified identifier may further indicate the encryption manner used to obtain the encrypted identity information.

It should be further noted that the first message may be any one of a registration request message, an attachment request message, a location area update message, a service request message, and an identity response message.

Step 302. The first network device sends a permanent identity request message to a first security function entity when receiving the first message, where the permanent identity request message carries the first identity information.

The first security function entity may be an AUSF function entity in the 5G network architecture shown in FIG. 1. In addition, if the AMF and the SEAF are two different function entities, the first security function entity may be alternatively the SEAF.

After receiving the first message, the first network device may obtain the first identity information carried in the first message. Because the first identity information is encrypted, the first network device may send the permanent identity request message carrying the first identity information to the first security function entity, to obtain second identity information which decrypted from the first identity information. The permanent identity request message may be a SUPI request message, or may be a location update request message.

Optionally, when the first message carries the first routing information, the first network device may determine the home network of the terminal based on the first routing information, to determine the first security function entity in the home network. Specifically, the first network device may determine a preconfigured decryption function entity as the first security function entity, and send the permanent identity request message to the first security function entity.

Optionally, when the first message carries the second routing information, the first network device may determine, based on the second routing information, a function entity used to decrypt the first identity information. Alternatively, the first network device may add the second routing information to the permanent identity request message, and send the permanent identity request message to the first security function entity.

Optionally, when the identifier information carried in the first message is the first identifier, and the first identifier is not temporary identity information, the first network device may send, to the first security function entity, an authentication request message used to request to perform authentication for the terminal, where the authentication request message carries the first identity information. If the first message carries the first identifier, the first identifier is temporary identity information, and the first network device may obtain context information of the terminal based on the temporary identity information, the first network device does not trigger authentication. If the first network device cannot obtain a context of the terminal based on the temporary identity information, the first network device may send an identity request (identity request) message to the terminal, to request the permanent identity of the terminal. Then, the terminal may send the first identity information to the first network device according to the identity request message, and the first network device may trigger authentication for the terminal based on the first identity information.

Optionally, when the first identifier is the bit information, the first network device may not parse the first identifier when receiving the first message, but forward the first identifier to the first security function entity. Alternatively, the first network device may parse the first identifier, and send the permanent identity request message to the first security function entity after determining, by using the first identifier, that the first identity information is encrypted identity information.

Optionally, when the identifier information carried in the first message is the second identifier, the first network device may add the second identifier to the permanent identity request message sent to the first security function entity.

Optionally, when the identifier information carried in the first message is the third identifier, the first network device may parse the third identifier. When determining, by using the third identifier, that the first identity information is encrypted identity information, the first network device may send the permanent identity request message carrying the first identity information and the third identifier to the first security function entity.

Optionally, when the identifier information carried in the first message includes the first identifier and the second identifier, the first network device may send the permanent identity request message carrying the second identifier and the first identity information to the first security function entity after determining, by using the first identifier, that the first identity information is encrypted identity information.

Step 303. The first security function entity sends a permanent identity reply message, where the permanent identity reply message carries second identity information.

After receiving the permanent identity request message, the first security function entity may obtain the second identity information and send the second identity information to the first network device. The permanent identity reply message may be a SUPI response message, or may be a location update response message.

The first security function entity may obtain the second identity information by using the following several methods.

(1) The first security function entity decrypts the first identity information by using a stored private key, to obtain the second identity information.

(2) The first security function entity may forward the received first identity information to a second network device, and the second network device decrypts the first identity information to obtain the second identity information. Then, the second network device returns the obtained second identity information to the first security function entity. The second network device stores a private key, and the second network device may be any one of an authentication credential repository and processing function (ARPF) entity, a unified data management (UDM) entity, an identity decryption function (IDF) entity, a key management server (KMS), an authentication center (AuC), or a function entity that stores a key and that is used for decryption.

Optionally, when the permanent identity request message carries the first routing information, the first security function entity may forward the first identity information and the first routing information together to the second network device. When the second network device is a network device storing private decryption keys of different operator networks, the second network device may obtain a private key of the home network of the terminal based on the first routing information, and decrypt the first identity information based on the obtained private key.

In another possible implementation, the first security function entity may directly forward the received permanent identity request message to the second network device, to request the second identity information from the second network device.

(3) The first security function entity may forward the received first identity information to a second network device. When the second network device cannot find a private key, the second network device may send a request to a third network device, and the third network device decrypts the first identity information to obtain the second identity information. Then the third network device transmits the second identity information to the first security function entity by using the second network device. The third network device stores the private key.

(4) The first security function entity may obtain a private decryption key based on routing information, and decrypt the first identity information by using the obtained private decryption key, to obtain the second identity information. The routing information is routing information carried in the permanent identity request message received by the first security function entity, and the routing information may be the first routing information and/or the second routing information.

For example, the first security function entity is a SEAF entity, the second network device is an AUSF entity, and the third network device is an ARPF entity. Then, the private key is stored in the ARPF, and the ARPF entity decrypts the first identity information to obtain the second identity information. Then, the ARPF entity sends the second identity information to the SEAF. For another example, the first security function entity is an AUSF entity, the second network device is a UDM entity, and the third network device is an AuC entity in the UDM entity or an entity that stores a private key and that has a decryption function. Then, the AuC or the entity that stores the private key and that has the decryption function decrypts the first identity information to obtain the second identity information. Then, the UDM entity returns the second identity information to the AUSF entity. The AuC and the entity that stores the key and that has the decryption function may interact with each other internally.

Optionally, when the received permanent identity request message further carries the second routing information, the first security function entity may determine, based on the second routing information, the function entity used to decrypt the first identity information. For example, the second routing information may indicate the first security function entity. In this case, the first security function entity decrypts the first identity information. Alternatively, the second routing information may indicate an ARPF entity. Then, the first security function entity may send the first identity information to the ARPF entity, and the ARPF entity decrypts the first identity information.

Optionally, when the permanent identity request message further carries the identifier information, the first security function entity may parse the identifier information. Specifically, when the identifier information carried in the permanent identity request message is the first identifier, the first security function entity may determine, based on the first identifier, whether the first identity information is encrypted identity information. When the first identity information is encrypted identity information, the first security function entity may obtain the second identity information based on the first identity information by using the foregoing method.

When the identifier information carried in the permanent identity request message is the second identifier, the first security function entity may determine the encryption manner of the first identity information based on the second identifier, to decrypt the first identity information based on the encryption manner by using a stored private key. Alternatively, the first security function entity may send the first identity information and the second identifier to the second network device, and the second network device determines the encryption manner of the first identity information based on the second identifier and decrypts the first identity information based on the encryption manner by using a stored private key. Alternatively, the first security function entity may send the first identity information and the second identifier to the third network device by using the second network device, and the third network device determines the encryption manner of the first identity information based on the second identifier and decrypts the first identity information based on the encryption manner.

When the identifier information carried in the permanent identity request message is the third identifier, the first security function entity may process the third identifier with reference to the foregoing manners of processing the first identifier and the second identifier, and details are not described in this embodiment of this application again.

Step 304. The first network device sends a second message to the first security function entity when receiving the permanent identity reply message, where the second message is used to trigger authentication for the terminal, and the second message carries the second identity information.

After receiving the permanent identity reply message sent by the first security function entity, the first network device may store the second identity information for later use when the terminal is re-registered or requests a service. In addition, the first network device may send the second message to the first security function entity, to trigger the authentication process for the terminal. The second message carries the second identity information, so that the first security function entity requests an authentication vector based on the second identity information, to perform authentication for the terminal. In addition, the second message may be an authentication initiation request message, or may be an Extensible Authentication Protocol/identity-request (EAP-AKA'/identity-request) message.

In this embodiment of this application, when the terminal accesses a network, the terminal may send the first message to the first network device, and add encrypted identity information, namely, the first identity information, to the first message. When receiving the first identity information from the terminal, the first network device may first obtain decrypted identity information, namely, the second identity information, of the first identity information from the first security function entity. After obtaining the second identity information, the first network device may send, to the first security function entity, the second message used to trigger the authentication process. In other words, this embodiment of this application provides a specific implementation process of triggering an authentication process when identity information is encrypted. Because identity information sent by the terminal to the first network device is encrypted identity information, the identity information is prevented from being intercepted or tampered with in a transmission process, and security of the terminal is ensured. In addition, during implementation of this application, the terminal may add the identifier information to the first message, to identify whether the first identity information is encrypted information and/or identify the encryption manner of the first identity information, so that the terminal can encrypt the identity information in the permanent identity more flexibly. In addition, when the identifier information is the second identifier or the third identifier, the function entity used to decrypt the first identity information can decrypt the first identity information faster and more conveniently.

The foregoing embodiment describes a process in which the first network device sends the permanent identity request message to the first security function entity, to request the second identity information, and after receiving the second identity information, sends the second message to the first security function entity, to trigger the authentication process. The following describes another method in which the first network device triggers the authentication process for the terminal after obtaining the second identity information corresponding to the first identity information.

Figure 4:
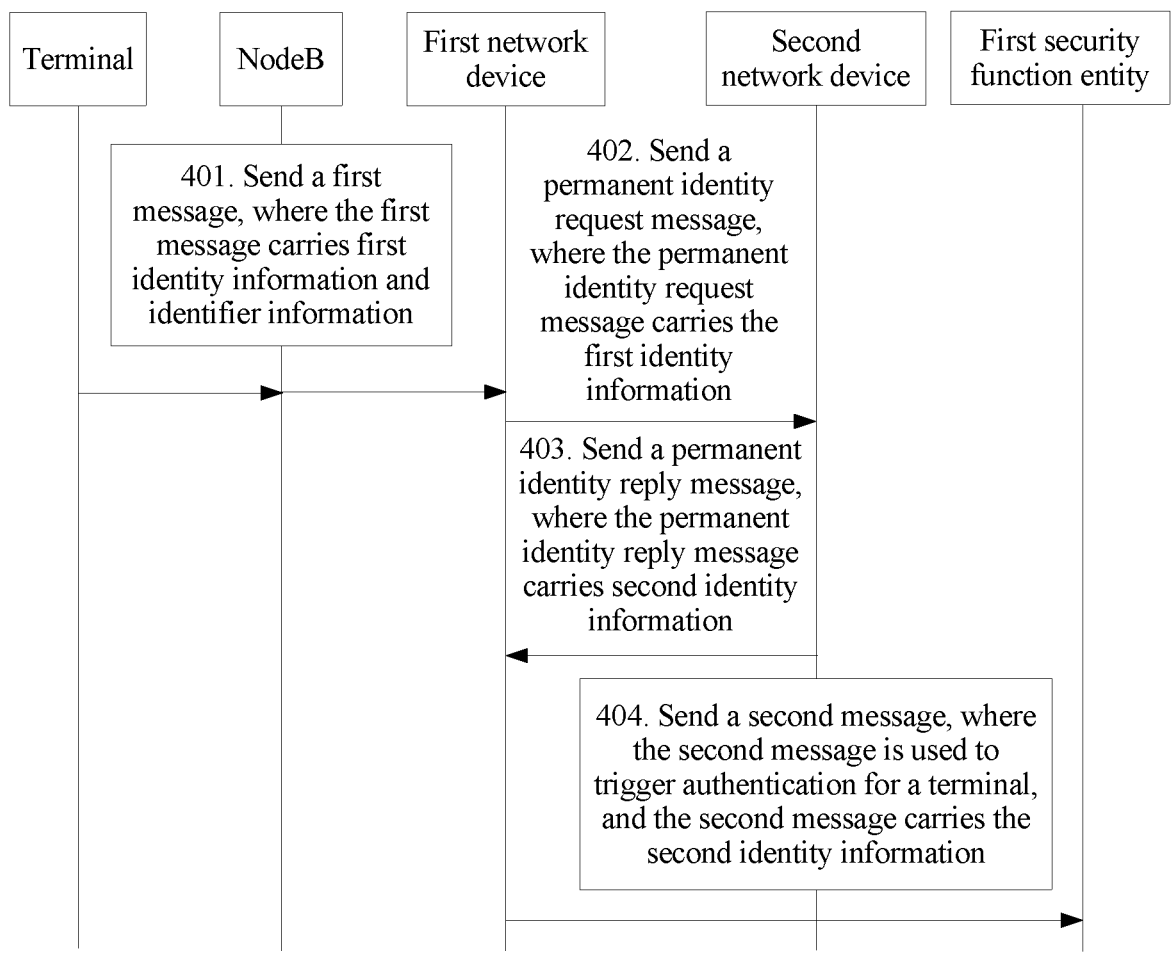
FIG. 4 is a schematic communication diagram of a network authentication triggering method according to an embodiment of this application.

FIG. 4 is a schematic communication diagram of still another network authentication triggering method according to an embodiment of this application. As shown in FIG. 4, the method includes the following steps.

Step 401. A terminal sends a first message to a first network device via a base station, where the first message carries first identity information and identifier information, and the first identity information is obtained by the terminal by encrypting identity information in a permanent identity of the terminal by using a public key.

For an implementation process of this step, refer to step 301. Details are not described in this embodiment of this application again.

Step 402. The first network device sends a permanent identity request message to a second network device when receiving the first message, where the permanent identity request message carries the first identity information, and the identifier information is used to identify whether the first identity information is encrypted identity information and/or identify an encryption manner of the first identity information.

After receiving the first message, the first network device may request second identity information from the second network device based on the first identity information carried in the first message. The second identity information is identity information obtained by decrypting the first identity information.

The second network device may be any one of an ARPF entity, a UDM entity, an IDF entity, or an AuC.

Step 403. The second network device sends a permanent identity reply message to the first network device, where the permanent identity reply message carries second identity information.

After receiving the permanent identity request message, the second network device may obtain the second identity information and send the second identity information to the first network device.

The second network device may obtain the second identity information by using the following two manners:

(1) When the second network device stores a private key, the second network device decrypts, based on the stored private key, the first identity information carried in the permanent identity request message, to obtain the second identity information.

Optionally, the permanent identity request message may carry first routing information. When the second network device is a network device storing private keys of different operator networks, the second network device may obtain a private key of a home network of the terminal based on the first routing information and decrypt the first identity information by using the obtained private key.

(2) When the second network device does not store a private key, the second network device forwards the first identity information to a third network device, and the third network device decrypts the first identity information to obtain the second identity information, and sends the second identity information to the second network device.

Step 404. The first network device sends a second message to the first security function entity when receiving the permanent identity reply message, where the second message is used to trigger an authentication process for the terminal, and the second message carries the second identity information.

For this step, refer to step 305 in the foregoing embodiment. Details are not described in this embodiment of this application again.

In this embodiment of this application, when the terminal accesses a network, the terminal may send the first message to the first network device, and add encrypted identity information, namely, the first identity information, to the first message. When receiving the first identity information from the terminal, the first network device may first obtain decrypted identity information, namely, the second identity information, of the first identity information by using the second network device. After obtaining the second identity information, the first network device sends, to the first security function entity, the second message used to trigger the authentication process. In other words, this embodiment of this application provides a specific implementation process of triggering an authentication process when identity information is encrypted. Because identity information sent by the terminal to the first network device is encrypted identity information, the identity information is prevented from being intercepted or tampered with in a transmission process, and security of the terminal is ensured. In addition, in this embodiment of this application, the first network device may directly request the second identity information from the second network device. In this way, compared with a case in which the first network device requests the second identity information from the first security function entity, and the first security function entity requests the second identity information from the second network device because the first security function entity does not store a private decryption key, this method reduces exchanged signaling.

The foregoing embodiment describes a process in which the first network device sends the permanent identity request message to the second network device to request the second identity information, and sends the second message to the first security function entity after receiving the second identity information, to trigger the authentication process. The following describes another method in which the first network device triggers the authentication process for the terminal after obtaining the second identity information corresponding to the first identity information.

Figure 5:
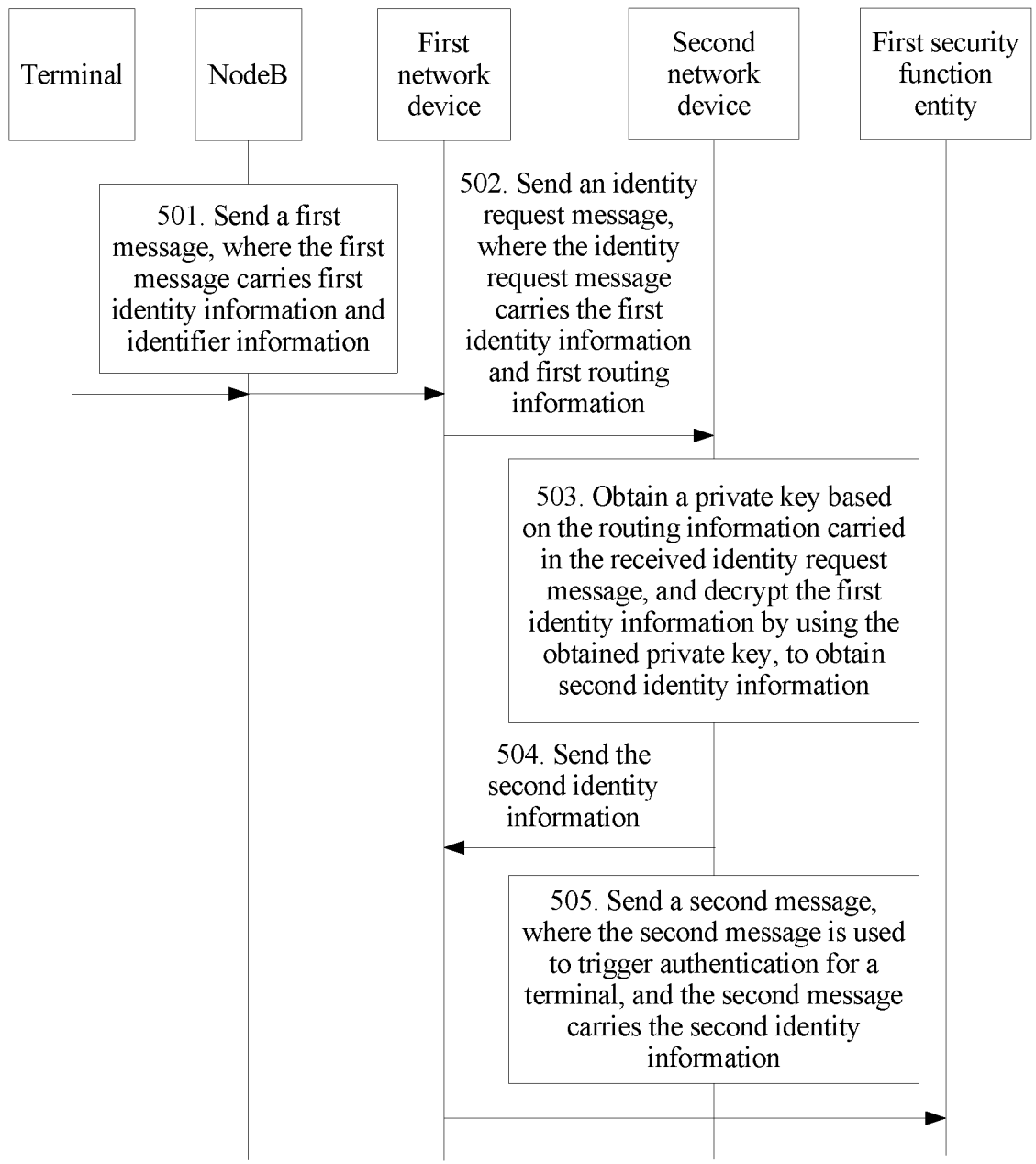
FIG. 5 is a schematic communication diagram of a network authentication triggering method according to an embodiment of this application.

FIG. 5 is a schematic communication diagram of still another network authentication triggering method according to an embodiment of this application. As shown in FIG. 5, the method includes the following steps.

Step 501. A terminal sends a first message to a first network device via a base station, where the first message carries first identity information and identifier information, the first identity information is obtained by the terminal by encrypting identity information in a permanent identity of the terminal based on a public key, and the identifier information is used to identify whether the first identity information is encrypted identity information and/or identify an encryption manner of the first identity information.

For an implementation process of this step, refer to step 301. Details are not described in this embodiment of this application again.

Step 502. The first network device sends an identity request message to a second network device when receiving the first message, where the identity request message carries the first identity information and first routing information.

The first routing information may be used by the first network device to determine a home network of the terminal.

After receiving the first message, the first network device may determine the home network of the terminal based on the first routing information, and send the identity request message carrying the first routing information and the first identity information to the preconfigured second network device. The second network device may be a network device in the home network of the terminal, or may be a network device storing private keys of different operator networks.

The second network device may be any one of an ARPF entity, a UDM entity, a KMS, or an AuC.

Optionally, the identity request message may carry the identifier information. For a specific processing method, refer to related explanation and description in step 302.

Step 503. The second network device obtains a private key based on the routing information carried in the received identity request message, and decrypts the first identity information by using the obtained private key, to obtain second identity information.

When the second network device is a network device in the home network of the terminal and stores a private key of the home network, the second network device may obtain the private key, and decrypt the first identity information by using the obtained private key, to obtain the second identity information.

When the second network device is a network device storing private keys of different operator networks, the second network device may obtain a private key of the home network of the terminal based on the first routing information carried in the identity request message, and decrypt the first identity information by using the obtained private key, to obtain the second identity information.

Optionally, when the second network device does not store a private key, the second network device may determine a third network device based on the first routing information, and send a private key obtaining request to the third network device, where the private key obtaining request may carry the first routing information. Then, the third network device may obtain a private key based on the first routing information and return the obtained private key to the second network device, and the second network device decrypts the first identity information by using the private key. In this case, the second network device may further store the private key, so that when an identity request message sent by a terminal in the home network is received subsequently, first identity information of the terminal may be decrypted by using the private key.

For example, the second network device is an AUSF entity, and the third network device is an ARPF entity, an AuC, or an IDF entity. Alternatively, the second network device is an ARPF entity, and the third network device is a function entity such as an AuC or an IDF entity in the ARPF.

Optionally, when the identity request message further carries the identifier information, the second network device may make reference to the related method in which the first security function entity processes the identifier information in step 303 in the foregoing embodiment, and details are not described in this embodiment of this application again.

Step 504. The second network device sends the second identity information to the first network device.

Step 505. The first network device sends a second message to the first security function entity, where the second message is used to trigger authentication for the terminal, and the second message carries the second identity information.

For an implementation process of this step, refer to step 301 in the foregoing embodiment. Details are not described in this embodiment of this application again.

In this embodiment of this application, when the terminal accesses a network, the terminal may send the first message to the first network device, and add encrypted identity information, namely, the first identity information, to the first message. When receiving the first identity information from the terminal, the first network device may first directly obtain a private decryption key from the second network device and decrypt the first identity information by using the obtained private decryption key, to obtain the second identity information. After obtaining the second identity information, the first network device sends, to the first security function entity, the second message used to trigger the authentication process. In other words, this embodiment of this application provides a specific implementation process of triggering an authentication process when identity information is encrypted. Because identity information sent by the terminal to the first network device is encrypted identity information, the identity information is prevented from being intercepted or tampered with in a transmission process, and security of the terminal is ensured. In addition, in this embodiment of this application, the first network device may store the obtained private decryption key. In this way, when the first network device receives encrypted identity information of a terminal in the same operator network of the current terminal, the encrypted identity information can be directly decrypted by using the private decryption key, thereby simplifying an operation process.

The foregoing embodiment describes an implementation process in which the first network device triggers the authentication process for the terminal after obtaining the second identity information corresponding to the first identity information. The following describes, with reference to FIG. 6a to FIG. 6d, an implementation process in which the first network device obtains the second identity information after triggering the authentication process.

An embodiment of this application provides a schematic communication diagram of a network authentication triggering method. The method includes the following steps.

Step 601. A terminal sends a first message to a first network device via a base station, where the first message carries first identity information, and the first identity information is obtained by the terminal by encrypting identity information in a permanent identity of the terminal by using a public key.

For an implementation process of this step, refer to step 301. Details are not described in this embodiment of this application again.

Step 602. The first network device sends a second message to a first security function entity when receiving the first message, where the second message is used to trigger authentication for the terminal, and the second message carries the first identity information.

The first network device may send the second message to the first security function entity when the first network device receives the first identity information but does not obtain second identity information, to trigger an authentication process for the terminal.

Step 603. The first security function entity obtains second identity information based on the first identity information when receiving the second message.

In this embodiment, if the first security function entity is an AUSF entity, and the first network device is a function entity combining an AMF and a SEAF, there is no need to determine whether the AMF sends the first message or the SEAF sends the first message. If the SEAF is an independent function entity, the first network device is the SEAF entity. Before sending the second message, the SEAF entity needs to receive the first identity information and the identifier information in the first message sent by the AMF entity. If the first security function entity is a SEAF entity deployed independently, the SEAF entity is deployed in a home network of the terminal.

After receiving the first identity information, the first security function entity may obtain the second identity information by using any one of the following three manners.

(1) The first security function entity decrypts the first identity information by using a stored private key, to obtain the second identity information.

(2) The first security function entity may forward the received first identity information to a second network device, and the second network device decrypts the first identity information to obtain the second identity information. Then, the second network device returns the obtained second identity information to the first security function entity. The second network device stores a private key, or the second network device may obtain a private key from a third network device based on routing information. Specifically, the second network device may be any one of an ARPF entity, a UDM entity, a KMS, or an AuC.

(3) The first security function entity may forward the received first identity information to a second network device. When the second network device cannot find a private key, the second network device may send a request to a third network device, and the third network device decrypts the first identity information to obtain the second identity information. Then the third network device transmits the second identity information to the first security function entity by using the second network device. The third network device stores the private key.

After obtaining the second identity information, the first security function entity may determine an authentication method. The authentication method includes an authentication method based on the Extensible Authentication Protocol (EAP) and an upgraded authentication method of an evolved packet system (EPS).

Step 604. The first security function entity sends the second identity information to a second security function entity.

Optionally, if in step 603, the first security function entity obtains the second identity information after the first security function entity sends the first identity information to the second security function entity and the second security function entity decrypts the first identity information based on a stored private key, this step may not be performed, and step 605 is directly performed.

Step 605. The second security function entity obtains an authentication vector based on the second identity information.

Step 606. The second security function entity sends the authentication vector to the first security function entity.

Figure 6A:
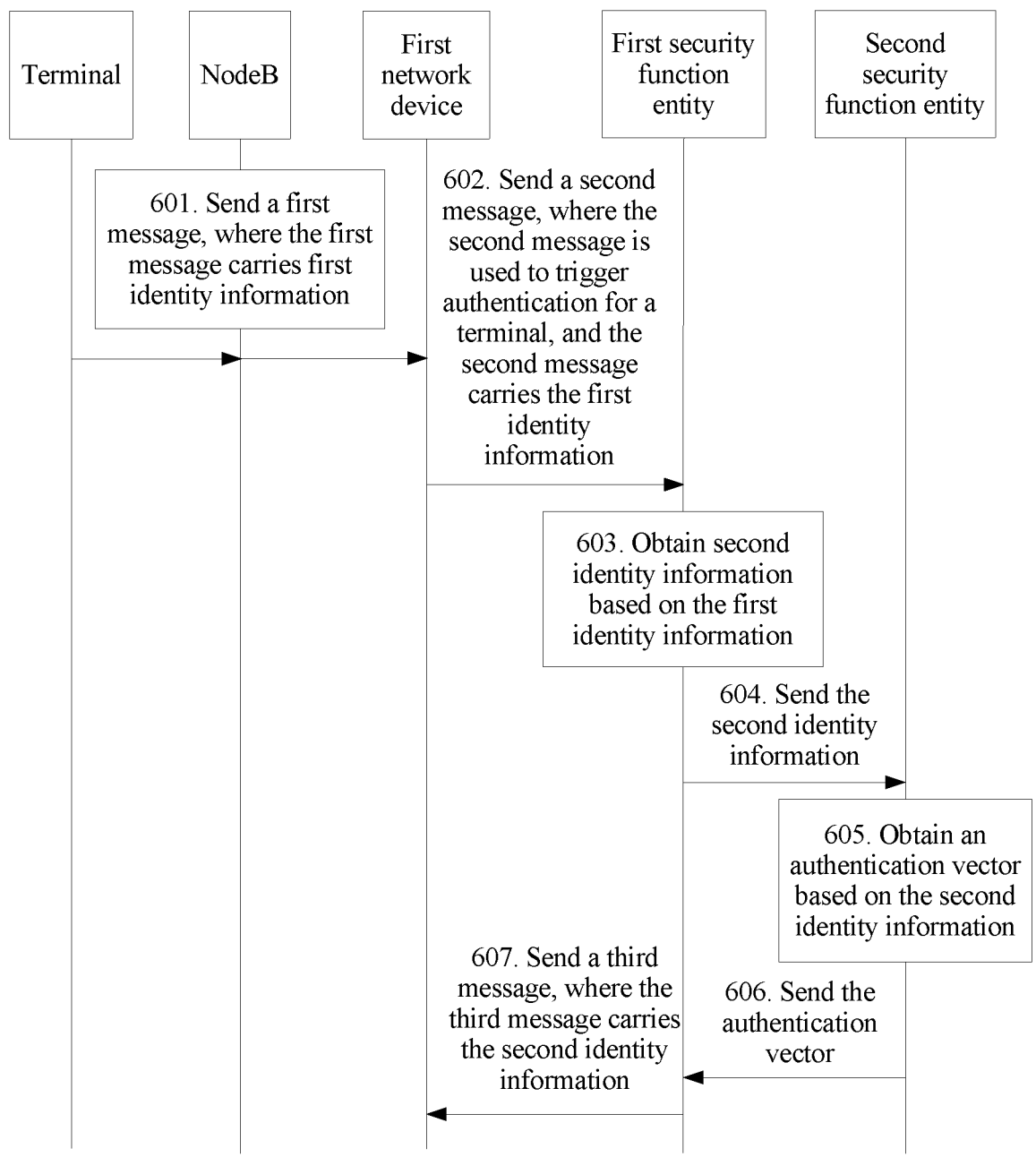
FIG. 6A is a schematic communication diagram of a network authentication triggering method according to an embodiment of this application.
Figure 6B:
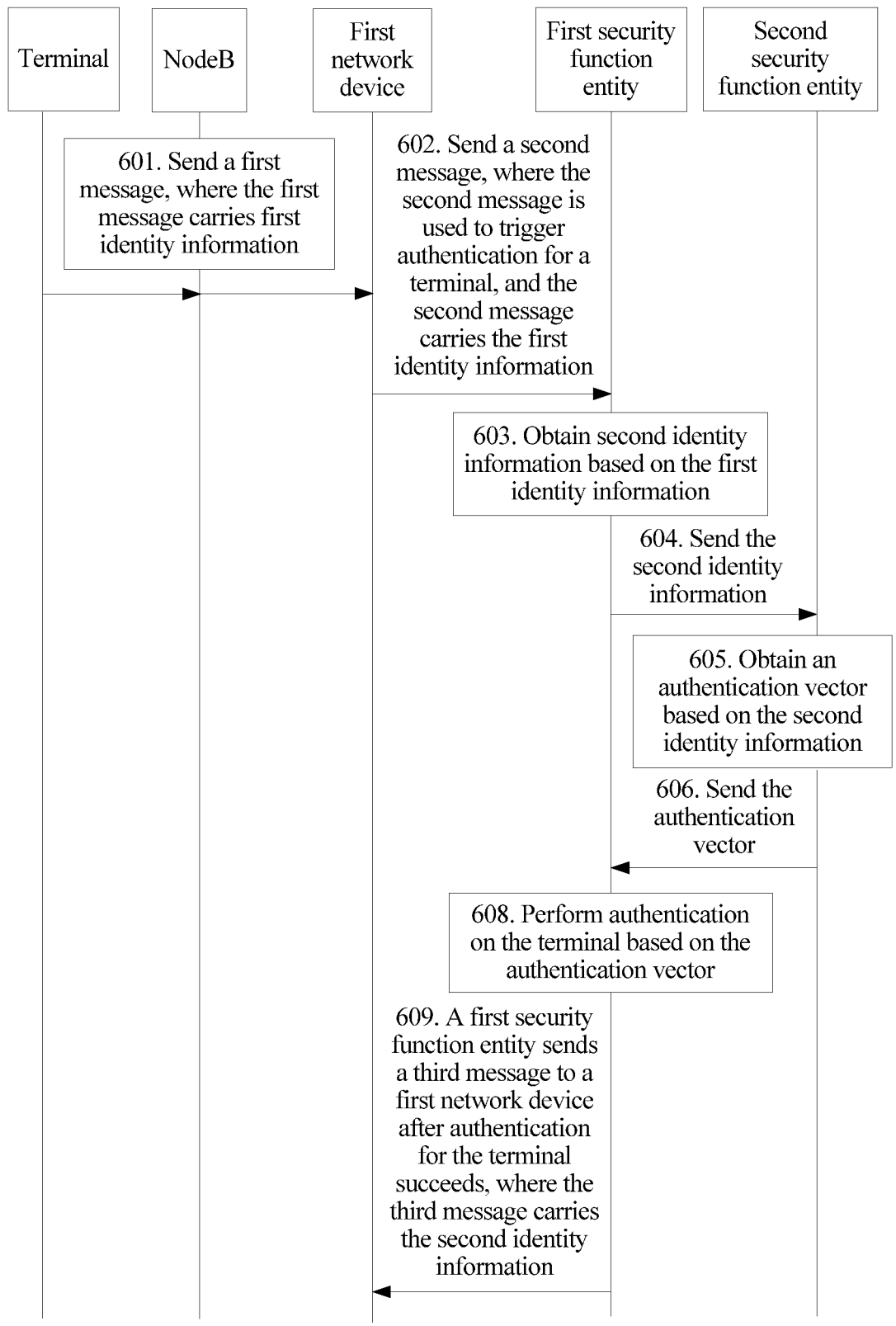
FIG. 6B is a schematic communication diagram of a network authentication triggering method according to an embodiment of this application.
Figure 6C:
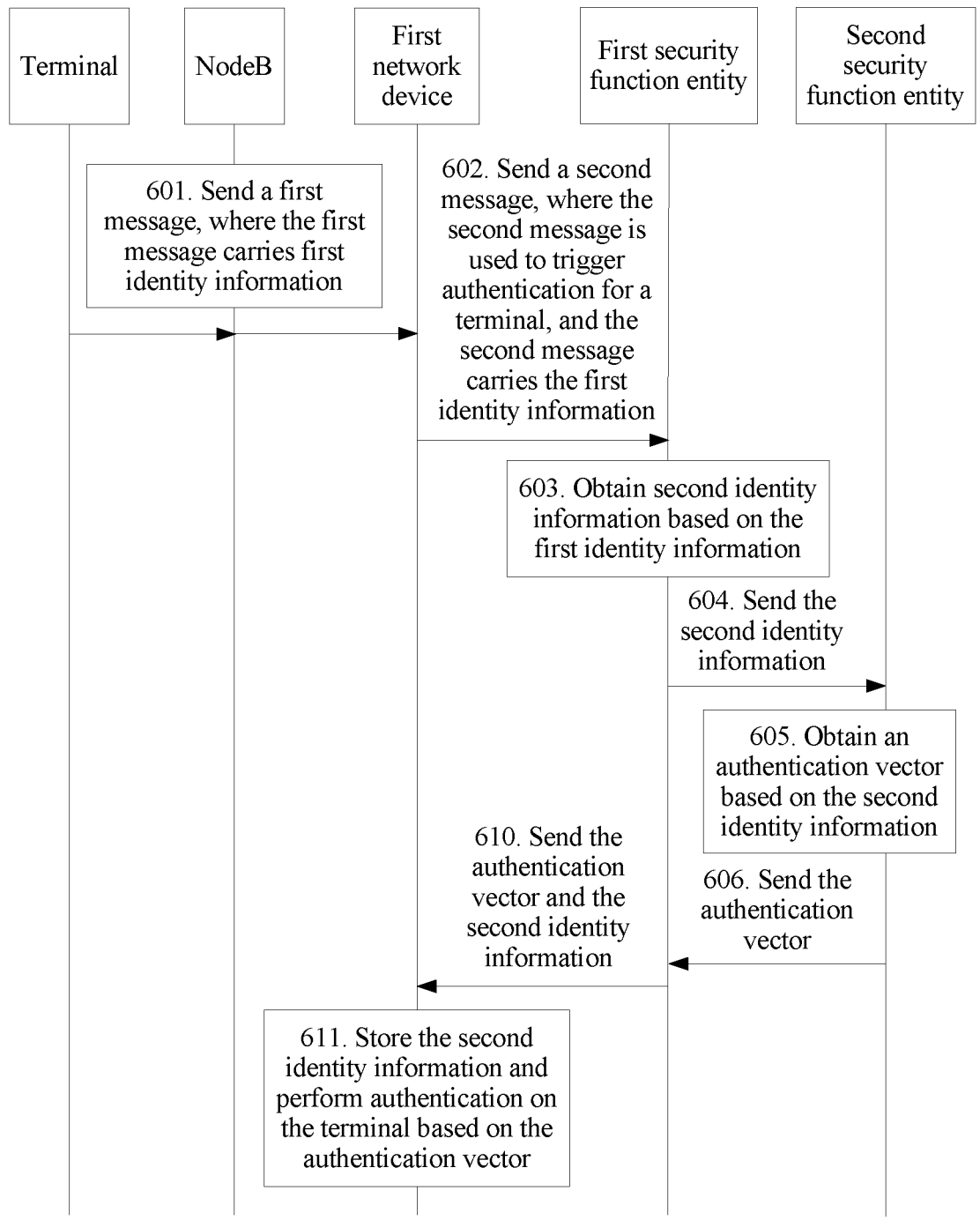
FIG. 6C is a schematic communication diagram of a network authentication triggering method according to an embodiment of this application.
Figure 6D:
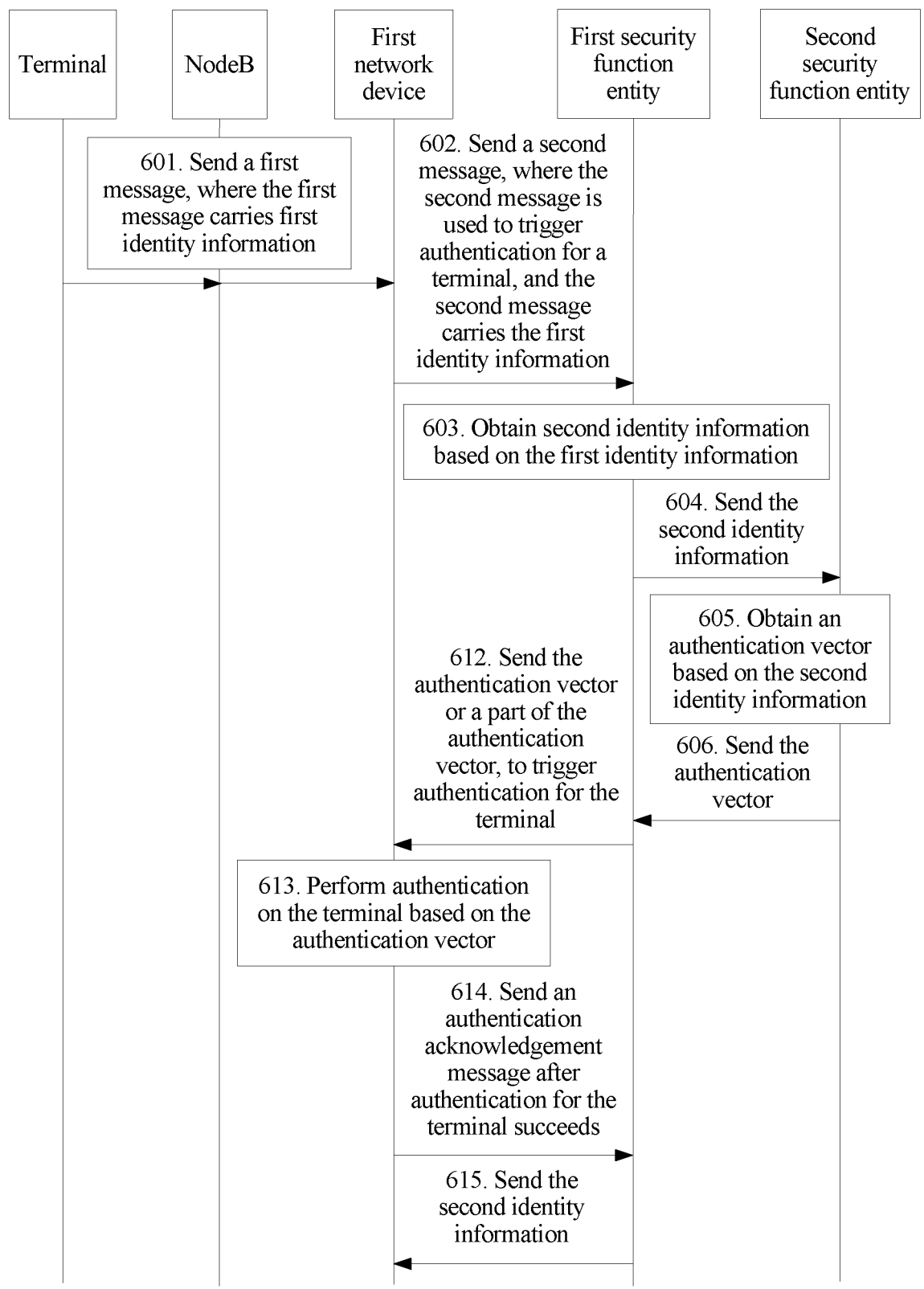
FIG. 6D is a schematic communication diagram of a network authentication triggering method according to an embodiment of this application.

After receiving the authentication vector, the first security function entity performs different operations based on different authentication methods selected in step 603. When the first security function entity performs authentication by using the EAP authentication method, the first security function entity may send the second identity information to the first network device by using two methods, as shown in FIG. 6a and FIG. 6b. When the first security function entity uses the EPS authentication method, the first security function entity may also send the second identity information to the first network device by using two methods, as shown in FIG. 6c and FIG. 6d.

As shown in FIG. 6a, the first security function entity may send the second identity information to the first network device in an authentication process. For a specific process, refer to step 607.

Step 607. The first security function entity sends a third message to the first network device when receiving the authentication vector, where the third message carries the second identity information.

When receiving the authentication vector, the first security function entity may start to perform authentication for the terminal. The third message may carry an authentication response message and the second identity information, and the authentication response message carries the authentication vector or a part of the authentication vector. Alternatively, the third message carries an authentication response message, the authentication response message carries the second identity information, and the authentication response message carries the authentication vector or a part of the authentication vector.

Optionally, the authentication response message is a user authentication request message, or an EAP-request (AKA'-challenge) message, or a 5G-AIA (authentication initiation answer) message.

It should be noted that when the authentication process is triggered in the manner described in steps 601 to 607, the first security function entity may send the second identity information while sending the authentication response message to the first network device. In this way, the first network device may obtain the second identity information in the authentication process, and this method reduces exchanged signaling when compared with a case in which the first network device obtains the second identity information before triggering the authentication process.

As shown in FIG. 6b, the first security function entity may send the second identity information to the first network device after determining that authentication for the terminal succeeds. For a specific process, refer to steps 608 and 609.

Step 608. The first security function entity performs authentication for the terminal based on the authentication vector when receiving the authentication vector.

Specifically, the first security function entity may interact with the terminal by using the authentication vector, to implement authentication for the terminal.

Step 609. The first security function entity sends a third message to the first network device after authentication for the terminal succeeds, where the third message carries the second identity information.

Specifically, successful authentication for the terminal by the first security function entity may be indicated in the following cases: The first security function entity sends or receives an EAP-success message, or successfully verifies the terminal, or receives a 5G-AC (authentication confirmation) message.

After determining that authentication for the terminal succeeds, the first security function entity may send the third message to the first network device. The third message carries an authentication success message used to notify the first network device that authentication for the terminal succeeds. The second identity information is carried in the authentication success message.

Certainly, the second identity information may not be carried in the authentication success message. In other words, the third message may carry the authentication success message and the second identity information.

Specifically, the authentication success message may be an EAP-success message, or a 5G-AK (authentication acknowledge) message. The 5G-AK message is a response message used to reply to the 5G-AC message.

It should be noted that when the authentication process is triggered by using the method described in steps 601 to 606 and steps 608 and 609, when receiving the first identity information, the first network device may directly trigger the authentication process. The first security function entity may send the second identity information while sending the authentication success message to the first network device after authentication succeeds. In this way, the process in which the first network device obtains the second identity information is completed together with authentication, so that exchanged signaling is reduced. In addition, because the first security function entity sends the second identity information and the authentication success message together to the first network device after authentication succeeds, identity information of the terminal can be better protected from being leaked, and security of the terminal is improved.

The foregoing describes, with reference to FIG. 6a and FIG. 6b, two methods for sending, by the first security function entity, the second identity information to the first network device when the first security function entity performs authentication by using the EAP authentication method. The following describes two methods for sending, by the first security function entity, the second identity information to the first network device when the first security function entity uses the EPS authentication method. When the EPS authentication method is used, the first security function entity needs to send the authentication vector to the first network device, and the first network device performs authentication for the terminal.

As shown in FIG. 6c, the first security function entity may send the authentication vector and the second identity information together to the first network device. For a specific process, refer to step 610.

Step 610. The first security function entity sends the authentication vector and the second identity information to the first network device when receiving the authentication vector.

Optionally, the first security function entity may send the authentication vector and the second identity information in a fixed format. For example, the second identity information is placed in first several bits of the third message, and a quantity of bits is greater than or equal to a length of the second identity information. The authentication vector is placed after the bits for the second identity information. Alternatively, the authentication vector is placed in first fixed bits, and the second identity information is placed in last several bits.

Step 611. When receiving the authentication vector and the second identity information, the first network device stores the second identity information, and performs authentication for the terminal based on the authentication vector.

The first network device may identify the second identity information and directly store the second identity information. Alternatively, when the first security function entity sends the authentication vector and the second identity information in the fixed format, the first network device may obtain the second identity information based on the fixed bits in the fixed format, where information in the fixed bit is the second identity information.

In addition, the authentication vector usually includes parameters such as an expected response (XRES) and a message authentication code (MAC). When the first network device is a function entity combining the SEAF and the AMF, after receiving the authentication vector, the first network device may store the XRES or the MAC in the authentication vector, and send remaining parameters in the authentication vector to the terminal, to interact with the terminal and implement authentication for the terminal. When the first network device is an independent SEAF, after receiving the authentication vector, the first network device may store the XRES or the MAC in the authentication vector, and send a remaining parameter in the authentication vector to the AMF entity, and the AMF entity sends the parameter to the terminal.

It should be noted that when the authentication process is triggered by using the method described in steps 601 to 606 and steps 610 and 611, when receiving the first identity information, the first network device may directly send the second message carrying the first identity information to the first security function entity, to trigger the authentication process. Then, after obtaining the authentication vector, the first security function entity may send the second identity information and the authentication vector together to the first network device. In this way, the first network device may obtain permanent identity information of the terminal before performing authentication for the terminal, and this method reduces exchanged signaling when compared with a case in which the first network device obtains the second identity information before triggering the authentication process.

As shown in FIG. 6d, the first security function entity may send the second identity information to the first network device after determining that authentication for the terminal succeeds, thereby improving security. For a specific process, refer to steps 611 to 614. It should be noted that in steps 611 to 614, the first security function entity may be an AUSF entity, and the corresponding first network device may be an entity combining an AMF and a SEAF. Alternatively, the first security function entity may be an independent SEAF, and the corresponding first network device is an AMF.

Step 612. When receiving the authentication vector or a part of the authentication vector, the first security function entity sends the authentication vector or the part of the authentication vector to the first network device, to trigger authentication for the terminal.

For example, the first security function entity may send an EAP-request/AKA'-challenge message to the first network device, and the EAP-Request/AKA'-challenge message carries the authentication vector or the part of the authentication vector. Alternatively, the first security function entity sends a 5G-AIA message, and the 5G-AIA message carries the authentication vector or the part of the authentication vector.

Step 613. The first network device performs authentication for the terminal based on the authentication vector when receiving the authentication vector or the part of the authentication vector.

When receiving the authentication vector or the part of the authentication vector, the first network device may send the authentication vector or the part of the authentication vector to the terminal. Then, the terminal and the first network device may complete authentication by using the authentication vector or the part of the authentication vector.

Specifically, the first network device may add the authentication vector or the part of the authentication vector to the EAP-Request/AKA'-challenge message, and send the EAP-Request/AKA'-challenge message to the terminal, or may add the authentication vector or the part of the authentication vector to an authentication request (authentication request) message, and send the authentication request message to the terminal.

Step 614. The first network device may send an authentication acknowledgement message to the first security function entity after authentication for the terminal succeeds.

The authentication acknowledgement message is used to notify the first security function entity that authentication for the terminal succeeds. Specifically, the authentication acknowledgement message may be 5G-AC.

In another possible implementation, the first network device may send an authentication acknowledgement message carrying the authentication response message to the first security function entity, and the authentication reply message is a response message of the authentication request message. After receiving the authentication reply message, the first security function entity may determine, based on the authentication reply message, that authentication for the terminal succeeds.

The authentication acknowledgement message may be an EAP-response/AKA'-challenge message.

Step 615. The first security function entity sends the second identity information to the first network device when receiving the authentication acknowledgement message sent by the first network device.

When receiving the authentication acknowledgement message sent by the first network device, the first security function entity can determine that the first network device successfully authenticates the terminal. In this case, the first security function entity may send the second identity information to the first network device, thereby improving the security.

Optionally, when receiving the authentication acknowledgement message sent by the first network device, the first security function entity may determine that the first network device successfully authenticates the terminal. In this case, the first security function entity may generate an authentication success message, and send the authentication success message and the second identity information together to the first network device. Certainly, the first security function entity may add the second identity information to the authentication success message and send the authentication success message to the first network device. The authentication success message may be a permanent identity reply message.

It should be noted that when the authentication process is triggered by using the method described in steps 601 to 606 and steps 612 to 615, when receiving the first identity information, the first network device may directly send the second message carrying the first identity information to the first security function entity, to trigger the authentication process. Then, after obtaining the second identity information and the authentication vector, the first security function entity sends only the authentication vector to the first network device, but does not send the second identity information. After authentication for the terminal based on the authentication vector succeeds, the first network device may send the authentication acknowledgement message to the first security function entity. After receiving the authentication acknowledgement message, the first security function entity sends the second identity information to the first network device only when determining that the first network device successfully authenticates the terminal. In this way, the identity information of the terminal can be better protected from being leaked, and security of the terminal is improved.

The foregoing embodiment describes a specific implementation process in which the first network device triggers the authentication process for the terminal and obtains the second identity information based on the first identity information. In addition, the authentication process for the terminal may be triggered by the first security function entity.

Figure 7A:
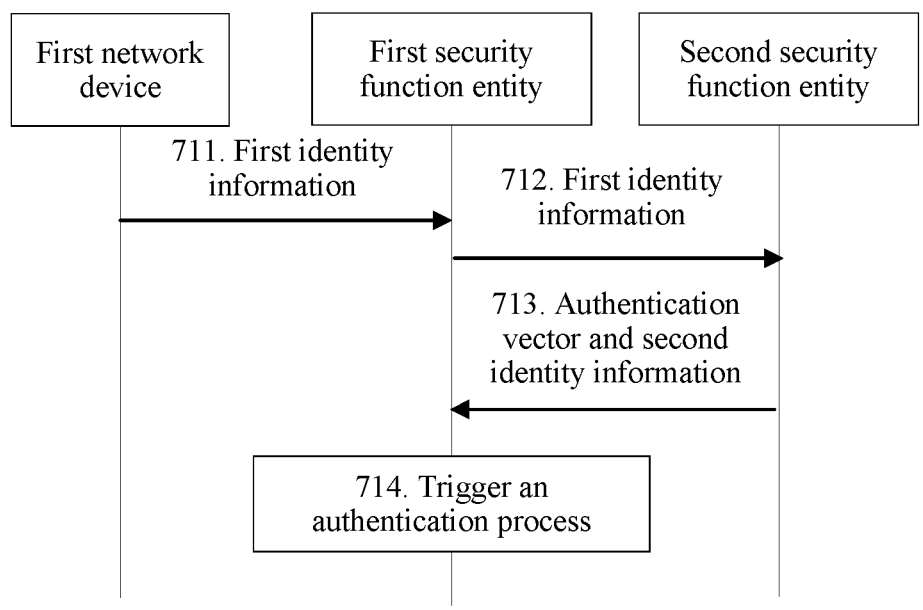
FIG. 7A is a schematic communication diagram of a network authentication triggering method according to an embodiment of this application.

In a scenario in which the first security function entity triggers the authentication process for the terminal, an embodiment of this application further provides a network authentication triggering method, and a first network device, a first security function entity, a second security function entity, and a system that are based on the method. The method includes: receiving, by the first security function entity, first identity information from the first network device, where the first identity information is obtained by the terminal by encrypting identity information in a permanent identity of the terminal based on a public key; sending, by the first security function entity, the first identity information to the second security function entity; and receiving, by the first security function entity, an authentication vector and second identity information from the second security function entity, and triggering an authentication process for the terminal, where the second identity information is obtained by decrypting the first identity information, and the authentication vector is obtained by the second security function entity based on the second identity information. For example, the method may be shown in FIG. 7a. The solution of this embodiment of this application provides a solution of triggering an authentication process when identity information is encrypted. In addition, in the solution of this embodiment of this application, the first security function entity triggers authentication for the terminal. Because an authentication process for the terminal is also triggered by the first security function entity when the terminal accesses a network by using a 3GPP technology, processing for a 3GPP technology and processing for a non-3GPP technology in the authentication process for the terminal are unified according to the solution of this embodiment, thereby reducing processing complexity of a network device.

Figure 7B:
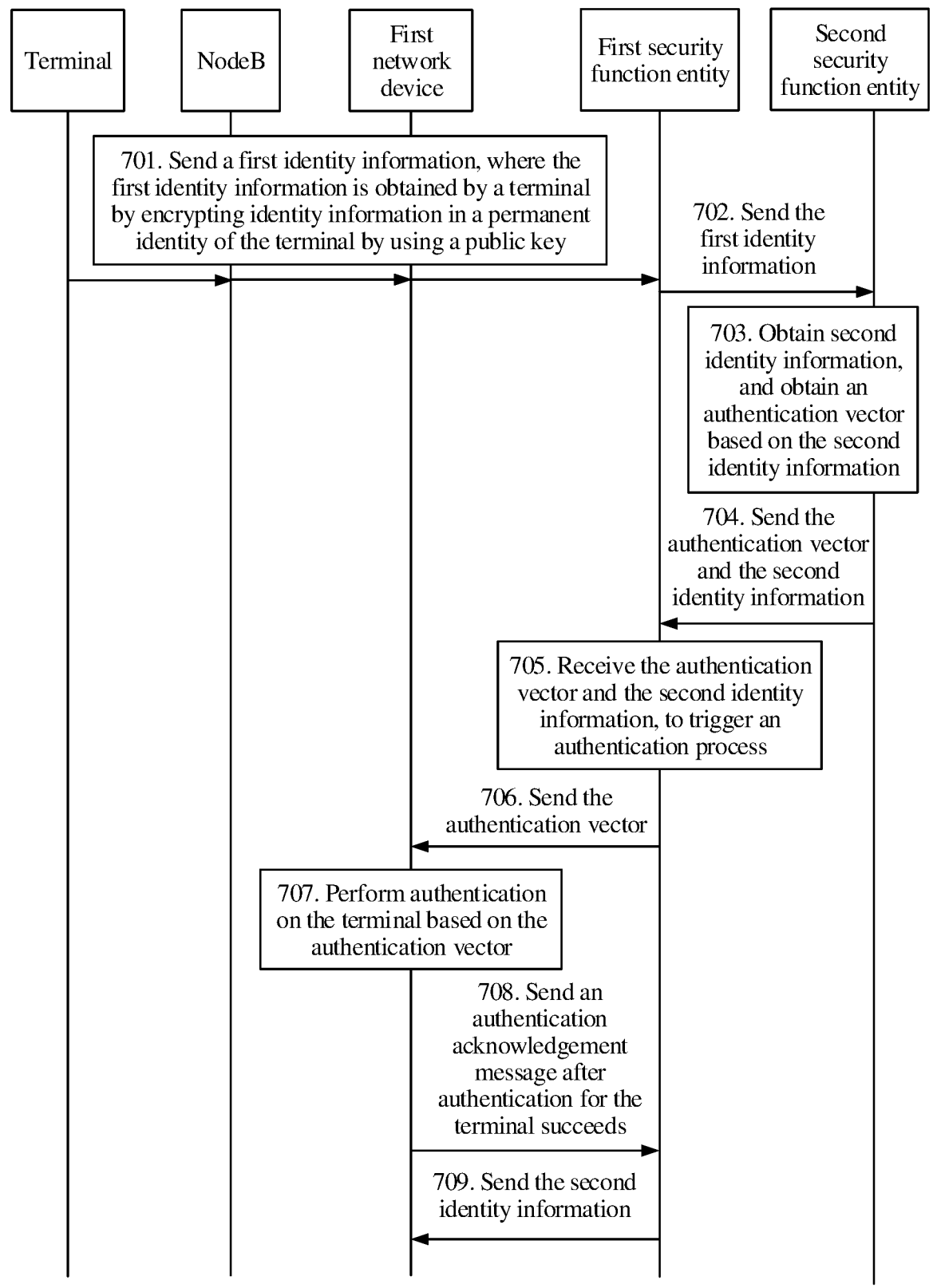
FIG. 7B is a schematic communication diagram of a network authentication triggering method according to an embodiment of this application.

The following describes, in detail with reference to FIG. 7b, a solution in which a first security function entity triggers an authentication process.

FIG. 7b is a schematic communication diagram of still another network authentication triggering method according to an embodiment of this application. As shown in FIG. 7b, the method includes the following steps.

Step 701. A terminal sends first identity information to a first security function entity via a base station and a first network device, where the first identity information is obtained by the terminal by encrypting identity information in a permanent identity of the terminal based on a public key.

When the terminal accesses a network, the terminal may send the first identity information to the base station, and then the base station sends the first identity information to the first network device. When receiving the first identity information, the first network device forwards the first identity information to the first security function entity. It should be noted that the first network device may send a permanent identity request message to the first security function entity, and add the first identity information to the permanent identity request message.

The public key may be stored in the terminal, or may be stored in a card that is in the terminal and that is used to store a long-term key, for example, a subscriber identification module (SIM), a universal subscriber identity module (USIM), a universal integrated circuit card (UICC), an embedded universal integrated circuit card (eUICC), or a 5G-universal integrated circuit card (5G-UICC). The permanent identity may be an international mobile subscriber identity (IMSI). When the permanent identity is an IMSI, the IMSI includes a mobile subscriber identification number (MSIN) and routing information. Therefore, the terminal may encrypt the MSIN in the IMSI by using the public key, to obtain the first identity information.

In addition, a first message further carries routing information, and the routing information is used by the first network device to determine a home network of the terminal, so that the first network device determines the first security function entity in the home network of the terminal.

Step 702. The first security function entity receives the first identity information and sends the first identity information to a second security function entity.

Optionally, the first security function entity may be an AUSF entity.

Step 703. The second security function entity receives the first identity information, obtains second identity information, and obtains an authentication vector based on the second identity information.

When receiving the first identity information, the second security function entity may decrypt the first identity information based on a stored private key, to obtain the second identity information. Alternatively, the second security function entity may send the first identity information to a second network device, and the second network device decrypts the first identity information to obtain the second identity information, and sends the second identity information to the second security function entity. Alternatively, the second security function entity may request a private key from a second network device, and the second network device determines the private key based on routing information and sends the private key to the second security function entity.

Optionally, the second security function entity may be an ARPF entity, and the second network device may be an AuC, a KMS, or an IDF.

After obtaining the second identity information, the second security function entity may determine a long-term key of the terminal based on the second identity information, and obtain the authentication vector based on the long-term key. The authentication vector is a parameter used by the first network device to perform authentication for the terminal. The long-term key is the same as a long-term key stored in the terminal.

Step 704. The second security function entity sends the authentication vector and the second identity information to the first security function entity.

Step 705. The first security function entity receives the authentication vector and the second identity information, and triggers an authentication process.

Step 706. The first security function entity sends the authentication vector to the first network device.

Optionally, the first security function entity may send the second identity information while sending the authentication vector to the first network device, in other words, the first security function entity may send the second identity information and the authentication vector to the first network device at the same time. In this case, step 707 may be performed without the need of performing step 708 and step 709.

Step 707. The first network device performs authentication for the terminal based on the authentication vector.

The authentication vector usually includes parameters such as an expected response (XRES) and a message authentication code (MAC). After receiving the authentication vector, the first network device may store the XRES or the MAC in the authentication vector, and send remaining parameters in the authentication vector to the terminal, to implement authentication for the terminal by interacting with the terminal.

It should be noted that when the first network device further receives the second identity information while receiving the authentication vector, the first network device may perform authentication for the terminal based on the authentication vector and store the received second identity information. In this case, step 708 and step 709 may not be performed subsequently.

Step 708. The first network device sends an authentication acknowledgement message to the first security function entity after authentication for the terminal succeeds.

The authentication acknowledgement message is used to notify the AUSF that authentication for the terminal succeeds.

Step 709. The first security function entity sends the second identity information to the first network device when receiving the authentication acknowledgement message.

Because when receiving the authentication acknowledgement message, the first security function entity can determine that authentication for the terminal succeeds, if the second identity information is sent to the first network device at this time, the permanent identity of the terminal can be better protected from being leaked, and security is ensured.

In this embodiment of this application, when accessing the network, the terminal may send the first identity information to the first security function entity by using the base station and the first network device. When receiving the first identity information from the terminal, the first security function entity may send the first identity information to the second security function entity, and the second security function entity may obtain the second identity information based on the first identity information, obtain the authentication vector based on the second identity information, and then send the authentication vector and the second identity information to the first security function entity. When receiving the authentication vector and the second identity information, the first security function entity triggers the authentication process. In other words, this embodiment of this application provides a specific implementation process of triggering an authentication process when identity information is encrypted. Because identity information sent by the terminal to the first network device is encrypted identity information, the identity information is prevented from being intercepted or tampered with in a transmission process, and security of the terminal is ensured. In addition, in this embodiment of this application, the authentication process is triggered by the first security function entity when the first security function entity receives the authentication vector. In a related technology, when the terminal accesses the network by using a 3GPP technology, the authentication process for the terminal is triggered by the first security function entity. The method provided in this embodiment of this application may be not only applied to the 3GPP technology, but also applied to a non-3GPP technology. In this embodiment of this application, when the terminal accesses the network by using the non-3GPP technology, the authentication process for the terminal is also triggered by the first security function entity. In other words, in this embodiment of this application, processing for the 3GPP and processing for the non-3GPP are unified. In this way, processing complexity of a network device can be reduced.

The foregoing mainly describes, from the perspective of interaction between different network devices, the solutions provided in the embodiments of the present application. It may be understood that to implement the foregoing functions, the first network device and the first security function entity each include a corresponding hardware structure and/or software module used to perform the functions. With reference to the examples described in the embodiments disclosed in this application, units and algorithm steps can be implemented by hardware or a combination of hardware and computer software in the embodiments of this application. Whether a function is implemented by hardware or by computer software driving hardware depends on a particular application and a design constraint condition of the technical solution. For each particular application, a person skilled in the art may use different methods to implement the described functions, but it should not be considered that the implementation goes beyond the scope of the technical solutions of the embodiments of this application.

In the embodiments of this application, function module division may be performed on the first network device and the first security function entity based on the method examples. For example, each function module may be obtained through division based on a corresponding function, or two or more functions may be integrated into one processing module. The integrated module may be implemented in a form of hardware, or may be implemented in a form of a function module of software. It should be noted that module division in the embodiments of this application is an example and is merely logical function division. During actual implementation, there may be another division manner.

Figure 8A:
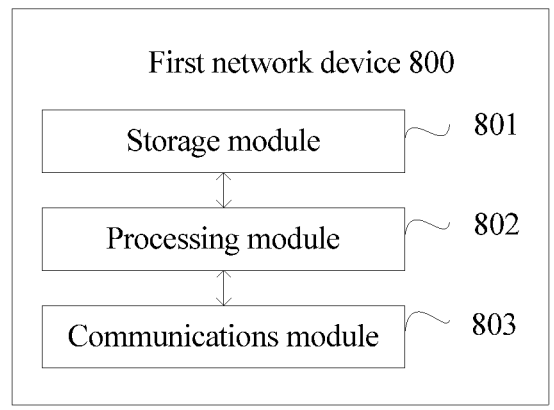
FIG. 8A is a schematic block diagram of a first network device according to an embodiment of this application.

When an integrated module is used, FIG. 8a is a possible schematic block diagram of a first network device in an embodiment of this application. A first network device 800 includes a processing module 802 and a communications module 803. The processing module 802 is configured to control and manage actions of the first network device. For example, the processing module 802 is configured to support the first network device in performing the processes 201 and 202 in FIG. 2, the processes 302 and 304 in FIG. 3, the processes 402 and 404 in FIG. 4, the processes 502 and 505 in FIG. 5, the processes 602, 611, 613, and 614 in FIG. 6a to FIG. 6d, the processes 711 to 714 in FIG. 7a, the processes 707 and 708 in FIG. 7b, and/or other processes using the technology described in this specification. The communications module 803 is configured to support the first network device in communicating with a first security function entity or another network device. The first network device may further include a storage module 801, configured to store program code and data of the first network device.

The processing module 802 may be a processor or a controller, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module may implement or execute various example logical blocks, modules, and circuits described with reference to content disclosed in this application. Alternatively, the processor may be a combination for implementing a computing function, for example, a combination of one or more microprocessors or a combination of the DSP and a microprocessor. The communications module 803 may be a communications interface, a transceiver, a transceiver circuit, or the like. The communications interface is a collective name, and during specific implementation, the communications interface may include a plurality of interfaces, for example, may include an interface between the first network device and the first security function entity or between the first network device and a second network device and/or another interface. The storage module 801 may be a memory.

Figure 8B:
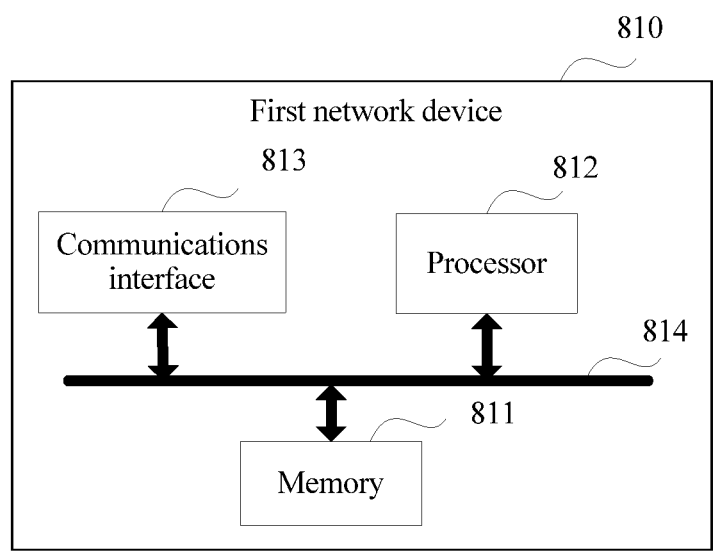
FIG. 8B is a schematic structural diagram of a first network device according to an embodiment of this application.

When the processing module 802 is a processor, the communications module 803 is a communications interface, and the storage module 801 is a memory, the first network device in this embodiment of this application may be the first network device shown in FIG. 8b.

As shown in FIG. 8b, the first network device 810 includes a processor 812, a communications interface 813, and a memory 811. Optionally, the first network device 810 may further include a bus 814. The communications interface 813, the processor 812, and the memory 811 may be connected to each other by using the bus 814. The bus 814 may be a Peripheral Component Interconnect (PCI) bus, an Extended Industry Standard Architecture (EISA) bus, or the like. The bus 814 may be categorized as an address bus, a data bus, a control bus, or the like. For ease of representation, only one bold line is used to represent the bus in FIG. 8*b*, but this does not mean that there is only one bus or only one type of bus.

The first network device shown in FIG. 8*a* and FIG. 8*b* may be an AMF entity in the system architecture of FIG. 1, or may be a SEAF module in an AMF function entity. When the AMF and the SEAF are not one function entity, the first network device may be the AMF function entity, or an MME function entity, or another entity having an access and mobility management function.

Figure 9A:
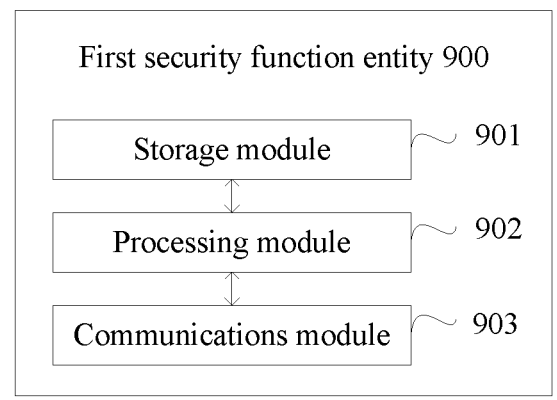
FIG. 9A is a schematic block diagram of a first security function entity according to an embodiment of this application.

When an integrated module is used, FIG. 9*a* is a possible schematic block diagram of a first security function entity in an embodiment of this application. A first security function entity 900 includes a processing module 902 and a communications module 903. The processing module 902 is configured to control and manage actions of the first security function entity. For example, the processing module 902 is configured to support the first security function entity in performing the process 202 in FIG. 2, the process 303 in FIG. 3, the process 404 in FIG. 4, the process 505 in FIG. 5, the processes 603, 604, 607, 608, 609, 610, 612, and 615 in FIG. 6*a* to FIG. 6*d*, the processes 712 and 713 in FIG. 7*a*, the processes 702, 705, 706, and 709 in FIG. 7*b*, and/or other processes using the technology described in this specification. The communications module 903 is configured to support the first security function entity in communicating with a first network device, a second security function entity, or another network device. The first security function entity may further include a storage module 901, configured to store program code and data of the first security function entity.

The processing module 902 may be a processor or a controller, for example, may be a CPU, a general-purpose processor, a DSP, an ASIC, an FPGA or another programmable logic device, a transistor logic device, a hardware component, or any combination thereof. The processing module may implement or execute various example logical blocks, modules, and circuits described with reference to content disclosed in this application. Alternatively, the processor may be a combination for implementing a computing function, for example, a combination of one or more microprocessors or a combination of the DSP and a microprocessor. The communications module 903 may be a communications interface, a transceiver, a transceiver circuit, or the like. The communications interface is a collective name, and during specific implementation, the communications interface may include a plurality of interfaces, for example, may include an interface between the first security function entity and the first network device or between the first security function entity and the second network device and/or another interface. The storage module 901 may be a memory.

Figure 9B:
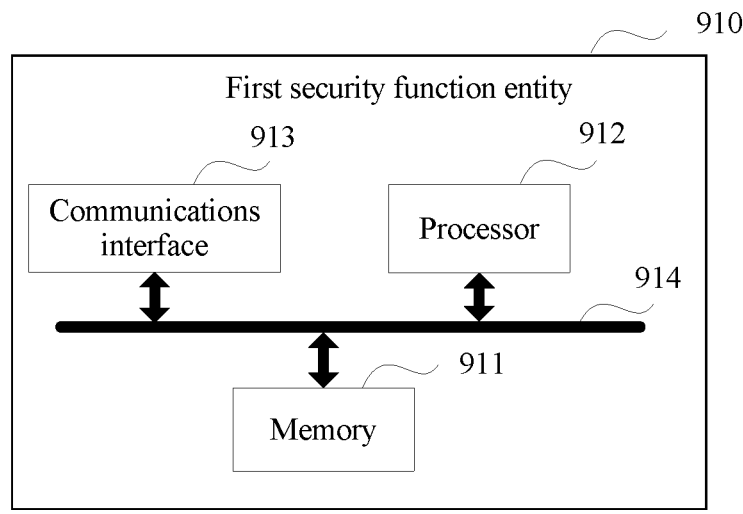
FIG. 9B is a schematic structural diagram of a first security function entity according to an embodiment of this application.

When the processing module 902 is a processor, the communications module 903 is a communications interface, and the storage module 901 is a memory, the first security function entity in this embodiment of this application may be the first security function entity shown in FIG. 9*b*.

As shown in FIG. 9*b*, the first security function entity 910 includes a processor 912, a communications interface 913, and a memory 911. Optionally, the first security function entity 910 may further include a bus 914. The communications interface 913, the processor 912, and the memory 911 may be connected to each other by using the bus 914. The bus 914 may be a PCI bus, an EISA bus, or the like. The bus 914 may be categorized as an address bus, a data bus, a control bus, or the like. For ease of representation, only one bold line is used to represent the bus in FIG. 9*b*, but this does not mean that there is only one bus or only one type of bus.

The first security function entity shown in FIG. 9*a* and FIG. 9*b* may be an AUSF entity in the system architecture of FIG. 1; or when an AMF in FIG. 1 does not include a SEAF, the first security function entity may be the SEAF.

Figure 10A:
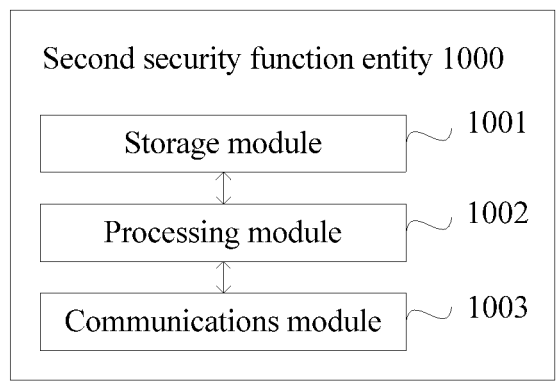
FIG. 10A is a schematic block diagram of a second security function entity according to an embodiment of this application.
Figure 10B:
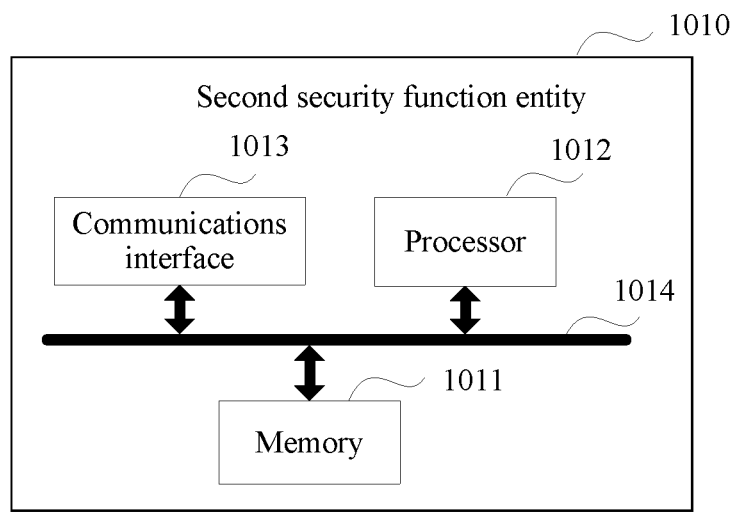
FIG. 10B is a schematic structural diagram of a second security function entity according to an embodiment of this application.

An embodiment of this application further provides a second security function entity. A schematic structural diagram of the second security function entity is similar to the schematic structural diagram of the first security function entity, as shown in FIG. 10*a* and FIG. 10*b*. Modules or components included in the second security function entity may correspondingly perform actions completed by the second security function entity in the foregoing methods, and details are not described herein again. The second security function entity shown in FIG. 10*a* or FIG. 10*b* may be an ARPF entity in FIG. 1.

The methods or algorithm steps described with reference to the content disclosed in the embodiments of this application may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a component of the processor. The processor and the storage medium may be located in an ASIC. In addition, the ASIC may be located in a first network device or a first security function entity. Certainly, the processor and the storage medium may exist in the first network device or the first security function entity as discrete components.

A person skilled in the art should be aware that, in one or more of the foregoing examples, the functions described in the embodiments of this application may be completely or partially implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instruction may be stored in a computer readable storage medium, or may be transmitted from a computer readable storage medium to another computer readable storage medium. For example, the computer instruction may be transmitted from a website, a computer, a server, or a data center to another website, another computer, another server, or another data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD), or the like.

The objectives, technical solutions, and beneficial effects of the embodiments of this application are further described in detail in the foregoing specific implementations. It should be understood that, the foregoing descriptions are only specific implementations of the embodiments of this application, but are not intended to limit the protection scope of the embodiments of this application. Any modification, equivalent replacement, or improvement made based on the technical solutions in the embodiments of this application shall fall within the protection scope of the embodiments of this application.

What is claimed is:

1. A system for triggering authentication, wherein the system comprises:
 a first network device configured to:
  receive a first message from a terminal, wherein the first message carries first identity information, identifier information, and routing information, wherein the first identity information comprises identity information of the terminal encrypted based on a public key, wherein the identifier information indicates an encryption manner of the first identity information, wherein the routing information comprises a first routing information and a second routing information, and wherein the second routing information comprises an identifier of a device used for decrypting the first identity information;
  determine a first security function entity within a home network of the terminal according to the first routing information;
  send a second message to the first security function entity, wherein the second message carries the first identity information, the identifier information, and the second routing information;
  receive an authentication vector from the first security function entity;
  perform authentication for the terminal based on the authentication vector;
  send an authentication acknowledgement to the first security function entity when the authentication for the terminal succeeds; and
  receive a second identity information, wherein the second identity information comprises decrypted identity information; and
 the first security function entity configured to:
  receive the second message from the first network device;
  determine a second network device according to the second routing information;
  send the first identity information and the identifier information to the second network device;
  receive the second identity information and the authentication vector from the second network device;
  transmit the authentication vector to the first network device;
  receive the authentication acknowledgement; and
  send the second identity information to the first network device in response to the authentication acknowledgement.

2. The system of claim 1, further comprising the second network device configured to:
 receive the first identity information and the identifier information from the first security function entity;
 decrypt the first identity information based on a private key and the identifier information to obtain the second identity information;
 determine the authentication vector according to the second identity information; and
 send the second identity information and the authentication vector to the first security function entity.

3. The system of claim 1, wherein the authentication acknowledgement is an Extensible Authentication Protocol (EAP)-success message.

4. The system of claim 1, wherein the system further comprises the terminal, and wherein the terminal is configured to send the first message to the first network device.

5. The system of claim 2, wherein the first network device is a security anchor function (SEAF) entity or a function entity combining an access and mobility management (AMF) entity and a SEAF entity, wherein the first security function entity is an authentication server function (AUSF) entity, and wherein the second network device is a unified data management (UDM) entity or an authentication repository and processing function (ARPF) entity.

6. The system of claim 1, wherein the identity information is a mobile subscriber identification number (MSIN) in an international mobile subscriber identity (IMSI) of the terminal, and wherein the IMSI is the permanent identity of the terminal.

7. The system of claim 1, wherein the first message is a registration request message, and wherein the second message is an authentication request message.

8. A method for triggering authentication, wherein the method comprises:
 receiving, by a first network device, a first message from a terminal, wherein the first message carries first identity information, identifier information, and routing information, wherein the first identity information comprises identity information of the terminal encrypted based on a public key, wherein the identifier information indicates an encryption manner of the first identity information, wherein the routing information comprises a first routing information and a second routing information, and wherein the second routing information comprises an identifier of a device used for decrypting the first identity information;
 determining, by the first network device according to the first routing information, a first security function entity within a home network of the terminal;
 sending, by the first network device, a second message to the first security function entity, wherein the second message carries the first identity information, the identifier information, and the second routing information;
 receiving, by the first security function entity, the second message;
 determining, by the first security function entity according to the second routing information carried in the received second message, a second network device;
 sending, by the first security function entity, the first identity information and the identifier information to the second network device;
 receiving, by the first security function entity, second identity information and an authentication vector from the second network device;
 transmitting by the first security function entity, the authentication vector to the first network device;
 receiving, by the first network device, the authentication vector;
 performing, by the first network device, authentication for the terminal based on the authentication vector;

sending, by the first network device, an authentication acknowledgement to the first security function entity when the authentication for the terminal succeeds;

receiving, by the first security function entity, the authentication acknowledgement; and sending, by the first security function entity, the second identity information to the first network device in response to the authentication acknowledgement.

9. The method of claim 8, further comprising:

receiving, by the second network device, the first identity information and the identifier information from the first security function entity;

decrypting, by the second network device, the first identity information based on a private key and the identifier information to obtain the second identity information;

determining, by the second network device, the authentication vector according to the second identity information; and sending, by the second network device, the second identity information and the authentication vector to the first security function entity.

10. The method of claim 8, wherein the authentication acknowledgement is an Extensible Authentication Protocol (EAP)-success message.

11. The method of claim 8, further comprising sending, by the terminal, the first message to the first network device.

12. The method of claim 9, wherein the first network device is a security anchor function (SEAF) entity or a function entity combining an access and mobility management (AMF) entity and a SEAF entity, wherein the first security function entity is an authentication server function (AUSF) entity, and wherein the second network device is a unified data management (UDM) entity or an authentication repository and processing function (ARPF) entity.

13. The method of claim 8, wherein the identity information is a mobile subscriber identification number (MSIN) in an international mobile subscriber identity (IMSI) of the terminal, and wherein the IMSI is the permanent identity of the terminal.

14. The method of claim 8, wherein the first message is a registration request message, and wherein the second message is an authentication request message.

* * * * *